US009854289B2

(12) United States Patent
Barton et al.

(10) Patent No.: US 9,854,289 B2
(45) Date of Patent: *Dec. 26, 2017

(54) SECURE MULTIMEDIA TRANSFER SYSTEM

(71) Applicant: TiVo Solutions Inc., San Carlos, CA (US)

(72) Inventors: James M. Barton, Alviso, CA (US); David Platt, Mountain View, CA (US)

(73) Assignee: TIVO SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,993

(22) Filed: Aug. 15, 2014

(65) Prior Publication Data

US 2014/0380353 A1 Dec. 25, 2014

Related U.S. Application Data

(63) Continuation of application No. 10/741,596, filed on Dec. 18, 2003, now Pat. No. 8,812,850, and a
(Continued)

(51) Int. Cl.
*H04N 21/266* (2011.01)
*H04L 29/06* (2006.01)
(Continued)

(52) U.S. Cl.
CPC ....... *H04N 21/26613* (2013.01); *G06F 21/33* (2013.01); *H04L 9/0897* (2013.01); *H04L 9/3247* (2013.01); *H04L 9/3263* (2013.01);

*H04L 63/0823* (2013.01); *H04L 63/123* (2013.01); *H04N 21/2347* (2013.01);
(Continued)

(58) Field of Classification Search
CPC . H04L 9/0819; H04L 9/0897; H04L 63/0823; H04L 9/3263; H04L 9/3247; H04L 63/123; H04L 2209/60; H04L 2463/062; G06F 21/10; G06F 21/33;
(Continued)

(56) References Cited

U.S. PATENT DOCUMENTS 5,371,794 A 12/1994 Diffie et al.
5,721,827 A 2/1998 Logan et al.
(Continued)

FOREIGN PATENT DOCUMENTS

DE 197 40 079 3/1999
EP 0 854 645 7/1998
(Continued)

OTHER PUBLICATIONS

Chinese Patent Office, Application No. 200510052755.7, Office Action dated Jul. 20, 2007, 6 pages.
(Continued)

*Primary Examiner* — Jeffrey D Popham
(74) *Attorney, Agent, or Firm* — Haley Guiliano LLP

(57) ABSTRACT

A method and apparatus for secure multimedia transfer provides an encrypted data transfer system that makes transferring multimedia content from a client to any incompatible system or to a system outside the location of the client very difficult.

24 Claims, 23 Drawing Sheets

Related U.S. Application Data continuation-in-part of application No. 10/220,558, filed as application No. PCT/US01/06313 on Feb. 27, 2001, now Pat. No. 7,908,635.

(60) Provisional application No. 60/434,767, filed on Dec. 18, 2002, provisional application No. 60/186,551, filed on Mar. 2, 2000.

(51) Int. Cl.
| | |
|---|---|
| H04L 9/08 | (2006.01) |
| H04L 9/32 | (2006.01) |
| G06F 21/33 | (2013.01) |
| H04N 21/2347 | (2011.01) |
| H04N 21/258 | (2011.01) |
| H04N 21/4405 | (2011.01) |

(52) U.S. Cl.
CPC ... *H04N 21/25816* (2013.01); *H04N 21/4405* (2013.01); *H04L 2209/60* (2013.01); *H04L 2463/062* (2013.01)

(58) Field of Classification Search
CPC ......... H04N 21/26613; H04N 21/4405; H04N 21/2347; H04N 21/25816
USPC .......................................................... 713/175
See application file for complete search history.

(56) References Cited

U.S. PATENT DOCUMENTS

| | | | |
|---|---|---|---|
| 5,808,662 A | 9/1998 | Kinney et al. | |
| 5,883,901 A | 3/1999 | Chiu et al. | |
| 5,896,566 A | 4/1999 | Averbuch et al. | |
| 5,963,909 A | 10/1999 | Warren et al. | |
| 5,990,884 A * | 11/1999 | Douma | H04L 29/06 |
| | | | 700/83 |
| 6,025,868 A | 2/2000 | Russo | |
| 6,040,851 A | 3/2000 | Cheng et al. | |
| 6,057,901 A | 5/2000 | Xu | |
| 6,065,050 A | 5/2000 | DeMoney | |
| 6,092,201 A * | 7/2000 | Turnbull | G06F 21/51 |
| | | | 380/231 |
| 6,166,730 A | 12/2000 | Goode et al. | |
| 6,216,231 B1 * | 4/2001 | Stubblebine | G06F 21/33 |
| | | | 713/156 |
| 6,219,839 B1 | 4/2001 | Sampsell | |
| 6,247,176 B1 | 6/2001 | Schein et al. | |
| 6,260,142 B1 | 7/2001 | Thakkar et al. | |
| 6,269,099 B1 * | 7/2001 | Borella | H04L 12/4604 |
| | | | 370/389 |
| 6,289,169 B1 | 9/2001 | Okuyama | |
| 6,351,538 B1 * | 2/2002 | Uz | H04N 5/913 |
| | | | 348/E7.056 |
| 6,442,328 B1 | 8/2002 | Elliott et al. | |
| 6,463,444 B1 | 10/2002 | Jain et al. | |
| 6,526,581 B1 | 2/2003 | Edson | |
| 6,751,321 B1 | 6/2004 | Kato et al. | |
| 6,754,885 B1 | 6/2004 | Dardinski et al. | |
| 6,917,610 B1 | 7/2005 | Kung et al. | |
| 6,931,531 B1 * | 8/2005 | Takahashi | H04N 5/913 |
| | | | 348/E7.056 |
| 6,941,387 B1 | 9/2005 | Takihara | |
| 6,957,344 B1 | 10/2005 | Goldshlag et al. | |
| 6,959,221 B1 | 10/2005 | Kataoka | |
| 6,972,786 B1 | 12/2005 | Ludwig | |
| 6,981,147 B1 | 12/2005 | Hamann et al. | |
| 7,006,881 B1 | 2/2006 | Hoffberg et al. | |
| 7,065,778 B1 | 6/2006 | Lu | |
| 7,113,994 B1 | 9/2006 | Swift et al. | |
| 7,188,087 B1 | 3/2007 | Goldstein | |
| 7,231,516 B1 | 6/2007 | Sparrell et al. | |
| 7,260,715 B1 | 8/2007 | Pasieka | |
| 7,870,584 B2 | 1/2011 | Russ et al. | |
| 7,929,560 B2 | 4/2011 | Morioka | |
| 8,156,528 B2 | 4/2012 | Baumgartner et al. | |
| 8,196,168 B1 | 6/2012 | Bryan et al. | |
| 8,214,422 B1 | 7/2012 | Woodward et al. | |
| 8,457,475 B2 | 6/2013 | Ellis et al. | |
| 8,528,032 B2 | 9/2013 | Ellis et al. | |
| 8,584,184 B2 | 11/2013 | Thomas et al. | |
| 8,601,507 B2 | 12/2013 | Billmaier et al. | |
| 8,627,385 B2 | 1/2014 | Davies et al. | |
| 8,881,210 B2 | 11/2014 | Barton et al. | |
| 9,055,273 B2 | 6/2015 | Barton et al. | |
| 9,258,592 B2 | 2/2016 | Stam | |
| 2001/0014206 A1 | 8/2001 | Artigalas et al. | |
| 2001/0039660 A1 | 11/2001 | Vasilevsky et al. | |
| 2002/0044656 A1 | 4/2002 | Candelore | |
| 2002/0054752 A1 | 5/2002 | Wood et al. | |
| 2002/0057893 A1 | 5/2002 | Wood et al. | |
| 2002/0059363 A1 * | 5/2002 | Katz | G06Q 20/1235 |
| | | | 709/203 |
| 2002/0067725 A1 | 6/2002 | Oguchi | |
| 2002/0100052 A1 | 7/2002 | Daniels | |
| 2002/0146237 A1 | 10/2002 | Safadi | |
| 2002/0147686 A1 | 10/2002 | Safadi et al. | |
| 2002/0164156 A1 | 11/2002 | Bilbrey | |
| 2003/0033606 A1 | 2/2003 | Puente et al. | |
| 2003/0066093 A1 | 4/2003 | Cruz-Rivera et al. | |
| 2003/0079227 A1 | 4/2003 | Knowles et al. | |
| 2003/0093790 A1 | 5/2003 | Logan et al. | |
| 2003/0097338 A1 * | 5/2003 | Mankovich | G06Q 30/06 |
| | | | 705/64 |
| 2003/0118014 A1 | 6/2003 | Lyer et al. | |
| 2003/0122922 A1 | 7/2003 | Saffer et al. | |
| 2003/0149988 A1 | 8/2003 | Ellis et al. | |
| 2003/0158958 A1 | 8/2003 | Chiu | |
| 2003/0188153 A1 | 10/2003 | Demoff et al. | |
| 2003/0204613 A1 | 10/2003 | Hudson et al. | |
| 2003/0204856 A1 | 10/2003 | Buxton | |
| 2003/0217328 A1 | 11/2003 | Agassi et al. | |
| 2003/0229900 A1 | 12/2003 | Reisman | |
| 2003/0233663 A1 | 12/2003 | Rao et al. | |
| 2004/0008289 A1 | 1/2004 | Hwang et al. | |
| 2004/0086120 A1 | 5/2004 | Akins et al. | |
| 2004/0086263 A1 | 5/2004 | Arora | |
| 2004/0109675 A1 | 6/2004 | Tsukidate | |
| 2004/0139047 A1 | 7/2004 | Reshsteiner et al. | |
| 2004/0216164 A1 | 10/2004 | Hayhurst | |
| 2004/0237104 A1 | 11/2004 | Cooper et al. | |
| 2004/0243815 A1 | 12/2004 | Tsukamura | |
| 2004/0268407 A1 | 12/2004 | Sparrell et al. | |
| 2005/0028208 A1 | 2/2005 | Ellis et al. | |
| 2005/0055730 A1 | 3/2005 | Daniels | |
| 2005/0108519 A1 | 5/2005 | Barton et al. | |
| 2005/0108769 A1 | 5/2005 | Arnold et al. | |
| 2005/0132401 A1 | 6/2005 | Boccon-Gibod et al. | |
| 2005/0166258 A1 | 7/2005 | Vasilevsky et al. | |
| 2005/0216942 A1 | 9/2005 | Barton | |
| 2005/0289591 A1 | 12/2005 | Vermola et al. | |
| 2006/0123455 A1 | 6/2006 | Pai et al. | |
| 2006/0127039 A1 | 6/2006 | Van Stam | |
| 2007/0086724 A1 | 4/2007 | Grady et al. | |
| 2007/0250445 A1 | 10/2007 | Ache | |
| 2008/0104202 A1 | 5/2008 | Barrett et al. | |
| 2008/0189737 A1 | 8/2008 | Ellis et al. | |
| 2009/0284693 A1 | 11/2009 | Adachi et al. | |
| 2010/0313238 A1 | 12/2010 | Baumgartner et al. | |
| 2011/0033166 A1 | 2/2011 | Barton et al. | |
| 2012/0131631 A1 | 5/2012 | Bhogal et al. | |
| 2013/0315569 A1 | 11/2013 | Ellis et al. | |
| 2014/0150008 A1 | 5/2014 | Barton et al. | |
| 2015/0055938 A1 | 2/2015 | Barton et al. | |
| 2015/0271559 A1 | 9/2015 | Barton et al. | |
| 2016/0191988 A1 | 6/2016 | Stam | |

FOREIGN PATENT DOCUMENTS

| | | |
|---|---|---|
| EP | 0 909 094 | 4/1999 |
| EP | 0 940 985 | 9/1999 |
| EP | 0 987 888 | 10/1999 |
| EP | 0 977 200 | 2/2000 |

(56) References Cited

FOREIGN PATENT DOCUMENTS

| EP | 1 079 628 | 2/2001 |
|---|---|---|
| EP | 1 102 481 | 5/2001 |
| EP | 1 143 439 | 10/2001 |
| EP | 2 180 706 | 4/2010 |
| JP | H07-087082 | 3/1995 |
| JP | H09-102827 | 4/1997 |
| JP | H09-121335 | 5/1997 |
| JP | H11-136658 | 5/1999 |
| JP | H11-242686 | 9/1999 |
| JP | H11-346166 | 12/1999 |
| JP | 2000-013697 | 1/2000 |
| JP | 2002-222138 | 8/2002 |
| JP | 2003-108371 | 4/2003 |
| JP | 2003-141031 | 5/2003 |
| JP | 2003-229903 A | 8/2003 |
| JP | 2003-525550 | 8/2003 |
| JP | 2003-525550 A | 8/2003 |
| JP | 2003-259333 A | 9/2003 |
| JP | 2003-526291 | 9/2003 |
| JP | 2003-324432 A | 11/2003 |
| JP | 2003-324711 A | 11/2003 |
| JP | 2004-007185 A | 1/2004 |
| JP | 2004-078424 A | 3/2004 |
| WO | WO 97/13368 | 4/1997 |
| WO | WO 98/10589 | 3/1998 |
| WO | WO 99/46702 | 9/1999 |
| WO | WO 99/52278 | 10/1999 |
| WO | WO9949717 | 10/1999 |
| WO | WO 99/60569 | 11/1999 |
| WO | WO 99/65237 | 12/1999 |
| WO | WO 00/01449 | 1/2000 |
| WO | WO 00/04549 | 1/2000 |
| WO | WO 00/04709 | 1/2000 |
| WO | WO 00/07368 | 2/2000 |
| WO | WO 00/08849 | 2/2000 |
| WO | WO 00/75925 | 12/2000 |
| WO | WO 00/76217 | 12/2000 |
| WO | WO 01/10127 A | 2/2001 |
| WO | WO 01/33427 | 5/2001 |
| WO | WO 01/45407 | 6/2001 |
| WO | WO 01/65862 A | 9/2001 |
| WO | WO 01/67756 A2 | 9/2001 |
| WO | WO 02/43353 A | 5/2002 |
| WO | WO 02/098063 | 12/2002 |

OTHER PUBLICATIONS

European Patent Office, Application No. 01 913 128.3-1241, Office Action dated Dec. 6, 2006, 7 pages.
European Patent Office, Application No. 01 913 128.3-1241, Office Action dated Oct. 7, 2009, 7 pages.
European Patent Office, Application No. 01913128.3, Office Action dated Jan. 9, 2012, 3 pages.
European Patent Office, Application No. 01913128.3, Office Action dated Sep. 12, 2011, 6 pages.
European Patent Office, Application No. 04 814 401.8-1241, Office Action dated Mar. 13, 2008, 6 pages.
European Patent Office, Application No. 04814400.0, Office Action dated Sep. 6, 2013.
European Patent Office, Application No. 05851948.9, Office Action dated Feb. 13, 2013.
European Patent Office, Application No. 05851948.9, Summons to Oral Proceedings dated Nov. 2, 2015.
European Patent Office, Application No. 10 180 631.3-1905, Office Action dated Jun. 19, 2013, 7 pages.
European Patent Office, Application No. 10153517.7, Extended European Search Report dated Aug. 31, 2012.
European Patent Office, Application No. 10180631.3, Extended European Search Report dated Aug. 31, 2012.
European Patent Office, Application No. 12167801.5, Extended European Search Report dated Sep. 10, 2015.
Japanese Patent Office, Application No. 2001-563543, Office Action dated Apr. 17, 2012, 5 pages.
Japanese Patent Office, Application No. 2001-563543, Office Action dated Aug. 6, 2010, 5 pages.
Japanese Patent Office, Application No. 2001-563543, Office Action dated Jan. 18, 2011, 5 pages.
Japanese Patent Office, Application No. 2001-563543, Office Action dated Sep. 13, 2011, 4 pages.
Japanese Patent Office, Application No. 2007-508490, Foreign Office Action dated Jul. 9, 2013.
Japanese Patent Office, Application No. 2007-508490, Pending Claims as of Jul. 9, 2013.
Japanese Patent Office, Application No. 2010-101051, Foreign Office Action dated Apr. 7, 2015.
Japanese Patent Office, Application No. 2010-239085, Foreign Office Action dated Dec. 24, 2013.
Japanese Patent Office, Application No. 2012-052320, Foreign Office Action dated Jul. 9, 2013.
Japanese Patent Office, Application No. 2012-052320, Foreign Office Action dated Jun. 17, 2014.
United States Patent and Trademark Office, U.S. Appl. No. 10/741,596, Non-Final Office Action dated Oct. 15, 2008.
United States Patent and Trademark Office, U.S. Appl. No. 10/741,596, Non-Final Office Action dated Apr. 27, 2009.
United States Patent and Trademark Office, U.S. Appl. No. 11/105,032, Non-Final Office Action dated Jun. 22, 2009.
United States Patent and Trademark Office, U.S. Appl. No. 11/105,032, Final Office Action dated Dec. 30, 2009.
United States Patent and Trademark Office, U.S. Appl. No. 10/741,596, Final Office Action dated Jan. 27, 2010.
United States Patent and Trademark Office, U.S. Appl. No. 10/741,596, Non-Final Office Action dated Jul. 2, 2010.
United States Patent and Trademark Office, U.S. Appl. No. 10/220,558, Notice of Allowance dated Nov. 8, 2010.
United States Patent and Trademark Office, U.S. Appl. No. 10/741,596, Final Office Action dated Dec. 9, 2010.
United States Patent and Trademark Office, U.S. Appl. No. 11/105,032, Non-Final Office Action dated Mar. 23, 2011.
United States Patent and Trademark Office, U.S. Appl. No. 10/741,596, Non-Final Office Action dated Apr. 13, 2011.
United States Patent and Trademark Office, U.S. Appl. No. 10/741,596, Final Office Action dated Sep. 2, 2011.
United States Patent and Trademark Office, U.S. Appl. No. 11/105,032, Final Office Action dated Oct. 25, 2011.
United States Patent and Trademark Office, U.S. Appl. No. 10/741,596, Non-Final Office Action dated Feb. 1, 2012.
United States Patent and Trademark Office, U.S. Appl. No. 11/105,032, Notice of Allowance dated Apr. 9, 2012.
United States Patent and Trademark Office, U.S. Appl. No. 12/945,753, Non-Final Office Action dated Jul. 17, 2012.
United States Patent and Trademark Office, U.S. Appl. No. 10/741,596, Advisory Action dated Jul. 20, 2012.
United States Patent and Trademark Office, Application No. 12/651,339, Final Office Action dated Aug. 10, 2012.
United States Patent and Trademark Office, U.S. Appl. No. 13/079,326, Non-Final Office Action dated Aug. 22, 2012.
United States Patent and Trademark Office, U.S. Appl. No. 12/945,753, Final Office Action dated Oct. 26, 2012.
United States Patent and Trademark Office, U.S. Appl. No. 13/079,326, Notice of Allowance dated Oct. 31, 2012.
United States Patent and Trademark Office, U.S. Appl. No. 12/910,741, Non-Final Office Action dated Jan. 2, 2013.
United States Patent and Trademark Office, U.S. Appl. No. 11/285,411, Final Office Action mailed Jan. 22, 2013.
United States Patent and Trademark Office, U.S. Appl. No. 12/651,339, Non-Final Office Action dated Apr. 5, 2013.
United States Patent and Trademark Office, U.S. Appl. No. 12/945,753, Final Office Action dated May 1, 2013.
United States Patent and Trademark Office, U.S. Appl. No. 10/741,596, Non-Final Office Action dated May 3, 2013.
United States Patent and Trademark Office, U.S. Appl. No. 12/910,741, Final Office Action dated Jun. 3, 2013.

(56) References Cited

OTHER PUBLICATIONS

United States Patent and Trademark Office, U.S. Appl. No. 12/704,245, Non-Final Office Action dated Jun. 11, 2013.
United States Patent and Trademark Office, U.S. Appl. No. 11/285,411, Non-Final Office Action mailed Aug. 2, 2013.
United States Patent and Trademark Office, U.S. Appl. No. 12/945,753, Advisory Action dated Aug. 8, 2013.
United States Patent and Trademark Office, U.S. Appl. No. 12/945,753, Notice of Allowance dated Sep. 17, 2013.
United States Patent and Trademark Office, U.S. Appl. No. 10/741,596, Final Office Action dated Oct. 11, 2013.
United States Patent and Trademark Office, U.S. Appl. No. 11/285,411, Final Office Action mailed Jan. 30, 2014.
United States Patent and Trademark Office, U.S. Appl. No. 12/651,339, Final Office Action dated Feb. 5, 2014.
United States Patent and Trademark Office, U.S. Appl. No. 10/741,596, Notice of Allowance dated Mar. 25, 2014.
United States Patent and Trademark Office, U.S. Appl. No. 12/905,965, Non-Final Office Action dated Mar. 28, 2014.
United States Patent and Trademark Office, U.S. Appl. No. 12/704,245, Final Office Action dated Apr. 7, 2014.
United States Patent and Trademark Office, U.S. Appl. No. 12/140,182, Final Office Action dated Apr. 29, 2014.
United States Patent and Trademark Office, U.S. Appl. No. 14/155,600, Non-Final Office Action dated Jul. 11, 2014.
United States Patent and Trademark Office, U.S. Appl. No. 14/155,600, Notice of Allowance dated Nov. 3, 2014.
United States Patent and Trademark Office, U.S. Appl. No. 12/910,741, Non-Final Office Action dated Dec. 5, 2014.
United States Patent and Trademark Office, U.S. Appl. No. 12/140,182, Non-Final Office Action dated Dec. 5, 2014.
United States Patent and Trademark Office, U.S. Appl. No. 14/155,600, Notice of Allowance dated Feb. 20, 2015.
United States Patent and Trademark Office, U.S. Appl. No. 12/910,741, Final Office Action dated Apr. 10, 2015.
United States Patent and Trademark Office, U.S. Appl. No. 11/285,411, Notice of Allowance mailed Jun. 5, 2015.
United States Patent and Trademark Office, U.S. Appl. No. 12/651,339, Non-Final Office Action dated Jun. 18, 2015.
United States Patent and Trademark Office, U.S. Appl. No. 12/704,245, Non-Final Office Action dated Jun. 24, 2015.
United States Patent and Trademark Office, U.S. Appl. No. 14/733,878, Non-Final Office Action dated Aug. 24, 2015.
United States Patent and Trademark Office, U.S. Appl. No. 11/285,411, Notice of Allowance dated Sep. 30, 2015.
United States Patent and Trademark Office, U.S. Appl. No. 14/733,878, Final Office Action dated Feb. 26, 2016.
United States Patent and Trademark Office, U.S. Appl. No. 12/651,339, Final Office Action dated Mar. 25, 2016.
United States Patent and Trademark Office, U.S. Appl. No. 12/910,741, Non-Final Office Action dated Apr. 14, 2016.
United States Patent and Trademark Office, U.S. Appl. No. 12/704,245, Final Office Action dated Apr. 26, 2016.
Australian Patent Office, Application No. SG 200603866-5, "Written Opinion" dated Dec. 23, 2008.
Australian Patent Office, Application No. SG 200603866-5, Claims dated Dec. 23, 2008.
Australian Patent Office, Application No. SG 200604127-1, Foreign Office Action dated Jun. 2, 2008.
Australian Patent Office, Application No. SG 200604127-1, Pending Claims as of Jun. 2, 2008.
Chinese Patent Office, Application No. 200480038102.7, Foreign Office Action dated Feb. 6, 2009.
Chinese Patent Office, Application No. 200480038102.7, Pending Claims as of Feb. 6, 2009.
Chinese Patent Office, Application No. 200510052755.7, Pending Claims as of Jul. 20, 2007.
European Patent Office, Application No. 01913128.3, Pending Claims as of Dec. 6, 2006.
European Patent Office, Application No. 01913128.3, Pending Claims as of dated Jan. 9, 2012.
European Patent Office, Application No. 04814400.0, Pending Claims as of Sep. 6, 2013.
European Patent Office, Application No. 04814401.8, Summons to Oral Proceedings dated Nov. 17, 2014.
European Patent Office, Application No. 04814401.8, Pending Claims as of Mar. 13, 2008.
European Patent Office, Application No. 04814401.8, Pending Claims as of Nov. 17, 2014.
European Patent Office, Application No. 05851948.9, Pending Claims as of Feb. 13, 2013.
European Patent Office, Application No. 05851948.9, Pending Claims as of Nov. 2, 2015.
European Patent Office, Application No. 09702115.8, Pending Claims as of Feb. 6, 2013.
European Patent Office, Application No. 09702115.8, Office Action dated Feb. 6, 2013.
European Patent Office, Application No. 10180631.3, Pending Claims as of Jun. 19, 2009.
European Patent Office, Application No. 10153517.7, Pending Claims as of Aug. 31, 2012.
European Patent Office, Application No. 10180631.3, Pending Claims as of Aug. 31, 2012.
European Patent Office, Application No. 10183950.4, Pending Claims as of Aug. 5, 2014.
European Patent Office, Application No. 10185497.4, Pending Claims as of Dec. 19, 2014.
European Patent Office, Application No. 10185497.4, Pending Claims as of Apr. 9, 2015.
European Patent Office, Application No. 11176312.4, Pending Claims as of Dec. 3, 2014.
European Patent Office, Application No. 12167801.5, Pending Claims as of Sep. 10, 2015.
Japanese Patent Office, Application No. 2001-563543, Claims dated Jan. 11, 2012.
Japanese Patent Office, Application No. 2001-563543, Trial Decision dated May 20, 2013.
Japanese Patent Office, Application No. 2006-545415, Foreign Office Action dated Apr. 23, 2010.
Japanese Patent Office, Application No. 2006-545415, Pending Claims as of Apr. 23, 2010.
Japanese Patent Office, Application No. 2010-101051, Pending Claims as of Apr. 7, 2015.
Japanese Patent Office, Application No. 2010-239085, Pending Claims as of Dec. 24, 2013.
Japanese Patent Office, Application No. 2012-052320, Pending Claims as of Jul. 9, 2013.
Japanese Patent Office, Application No. 2012-052320, Pending Claims as of Jun. 17, 2014.
Japanese Patent Office, Application No. 2014-006288, Pending Claims as of Oct. 28, 2014.
Japanese Patent Office, Application No. 2014-006288, Pending Claims as of Jul. 7, 2015.
Japanese Patent Office, Application No. 2014-186270, Foreign Office Action dated Jan. 5, 2016.
Japanese Patent Office, Application No. 2014-186270, Pending Claims as of Jan. 5, 2016.
World Intellectual Property Organization, Application No. PCT/US04/42212, International Search Report and Written Opinion dated Jan. 31, 2007.
World Intellectual Property Organization, Application No. PCT/US2004/42212, Pending Claims as of Jan. 31, 2007.
U.S. Appl. No. 60/379,635.
European Patent Office, Application No. 10185497.4, Foreign Office Action dated Jun. 28, 2016.
European Patent Office, Application No. 10183950.4, Foreign Office Action dated Aug. 5, 2014.
European Patent Office, Application No. 10185497.4, Extended European Search Report dated Dec. 19, 2014.
European Patent Office, Application No. 10185497.4, Extended European Search Report dated Apr. 9, 2015.

(56) References Cited

OTHER PUBLICATIONS

European Patent Office, Application No. 11176312.4, Extended European Search Report dated Dec. 3, 2014.
Japanese Patent Office, Application No. 2014-006288, Foreign Office Action dated Oct. 28, 2014, 4 pages.
Japanese Patent Office, Application No. 2014-006288, Foreign Office Action dated Jul. 7, 2015.

* cited by examiner

SECURE MULTIMEDIA TRANSFER SYSTEM

CROSS-REFERENCE TO RELATED APPLICATIONS; PRIORITY CLAIM

This application is a Continuation of U.S. patent application Ser. No. 10/741,596, filed Dec. 18, 2003; which claims benefit of Provisional Appln. 60/434,767, filed Dec. 18, 2002, the entire contents of which is hereby incorporated by reference as if fully set forth herein, under 35 U.S.C. §119(e). This application also claims benefit as a Continuation-in-part of application Ser. No. 10/220,558, filed Aug. 29, 2002, now U.S. Pat. No. 7,908,635 issued Mar. 15, 2011, which is the National Stage of International Application No. PCT/US01/06313, filed on Feb. 27, 2001, which further claims benefit of Provisional Appln. 60/186,551, filed Mar. 2, 2000, the entire contents of which is hereby incorporated by reference as if fully set forth herein, under 35 U.S.C. §120.

FIELD OF THE INVENTION

The invention relates to personal multimedia service. More particularly, the invention relates to a method and apparatus for securely transferring multimedia content between multimedia systems.

BACKGROUND OF THE INVENTION

With the advent of videocassette recorders (VCRs), TV viewers are able to record TV program events that are broadcasted in a given time slot and playback the recorded program content later. During the recording, a VCR changes the electrical signals of a program content into magnetic signals and stores the magnetic signals on magnetic tape. When playing back, the VCR changes magnetic signals into electrical signals and the attached TV set displays the program content of the signals on its screen.

With the development of digital technology, the VCRs are being superseded by digital video recorders (DVRs). Like a VCR, the functionality of a DVR is to record broadcasted program events for later playback. During recording, a DVR changes the electrical signals of broadcast program content into digital information, such as MPEG data streams, and stores the digital information in a memory device or directly stores the pre-digitized TV signals in the memory. When playing back, the DVR converts the digital information back to analog signals. An attached TV set displays the program content of the signals on its screen.

To record TV program events using a VCR, a user must manually select a channel and control the VCR or have someone else perform the operation. By using a DVR, however, the user may establish a program recording sequence by programming the DVR according to a TV program guide and have the recording performed automatically.

Although the DVR enables users to specify the recording time, channel, and duration for a plurality of events, it cannot meet the increasing needs in defining and capturing the program events in a more intelligent way. For instance, in situations where a user is far away from his DVR and TV set, he will be unable to program his DVR and record the program events that he likes.

What is desired is to establish a communication system through which a user may access to a centralized TV program guide database and program his DVR anywhere.

Additionally, such a system would provide a user with the ability to transfer recorded program material from one DVR to another DVR, or a server to a DVR, in a secure manner that preserves the program material provider's copyrights.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for secure multimedia transfer is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

A. System for Remote Access to Personal TV Service

Figure 1:
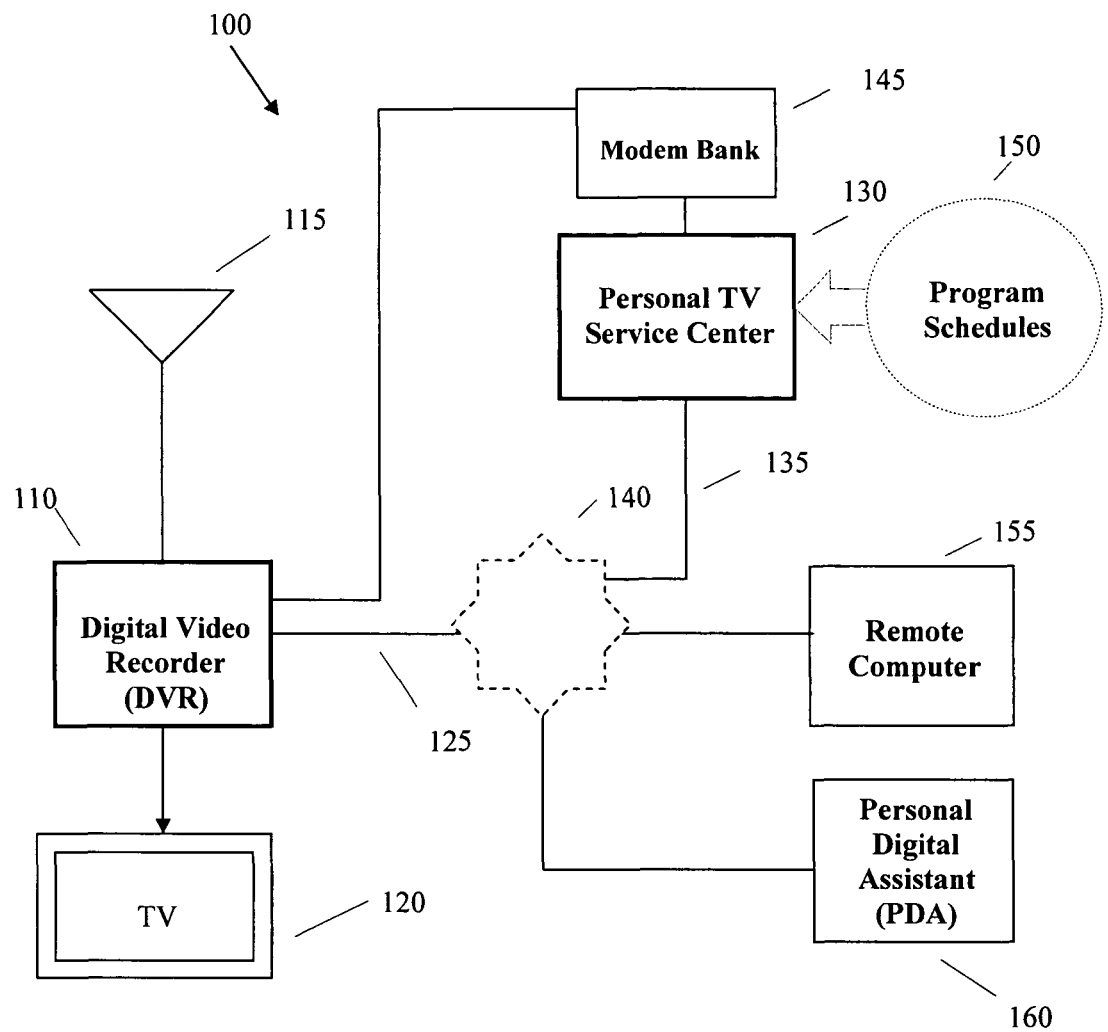
FIG. 1 is a block diagram illustrating a communication system for remote access to a centralized personal television service.

Referring to FIG. 1, a communication system for remote access to a personal TV service is shown, generally designated as 100. In accordance with one approach, a digital video recorder (DVR) 110 installed in a household communicates with a personal TV service center (hereinafter referred to as service center) 130, which provides program guide data, graphical resources (such as fonts, pictures, etc.), service information, and other forms of data that enable the DVR 110 to operate independently of the service center 130 to satisfy viewer interests. The functionality of a DVR is typified in U.S. Pat. No. 6,233,389 which is owned by the Applicant and is hereby incorporated by reference. The communication system uses a secure distribution architecture to transfer data between the DVR 110 and the service center 130 such that both the service data and the user's privacy are protected. The DVR 110 receives broadcast signals from an antenna 115 or receives television signals from a cable TV system.

In one embodiment of the invention, the DVR 110 generally comprises: a plurality of components that are necessary to digitize an analog television signal and convert it into a digital data stream; a plurality of components that are designed to record segments of said data stream; a plurality of storage facilities that are designed to retain segments of said data stream; a plurality of components that are designed to retrieve segments of said data stream, convert said data stream into an analog signal, and then modulate the signal onto a RF carrier, through which the signal is delivered to a standard TV set 120; and an interface 125, through which the DVR 110 communicates with a network 140.

The DVR 110 contains a local secure crypto chip that that contains a non-alterable private key. The DVR 110 secure functionality is further described in U.S. Pat. No. 6,385,739 which is owned by the Applicant and is hereby incorporated by reference.

The DVR 110 may be directly connected to the service center 130 by using its internal telephone modem to dial into an incoming call modem bank 145. The incoming call is first routed to the service center 130 for identification verification. Upon verification, the incoming call is authorized. The private modem bank 145 answers the call and the DVR 110 is granted access to the databases in the service center 130.

Alternatively, the DVR 110 may be indirectly connected to the service center 130 via the network 140. The interface 125 between the DVR 110 and the network 140 may be the internal telephone modem of the DVR 110, or a dedicated network interface such as a cable modem. The computer network 140 can be either a private network or the Internet. The DVR 110 initiates a connection to the computer network 140 by calling a local access telephone number for an Internet service provider (ISP). The ISP directs the network connection request to the service center 130 for identification verification. Upon verification, the network connection is authorized and the DVR 110 is granted access to the databases in the service center 130.

The service center 130 receives program schedule information 150 from external sources. The program schedule information 150 forms the basis of a program guide that TV viewers can use to select TV programs to be recorded. The service center 130 communicates with the computer network 140 through an interface 135.

TV viewers can use a remote computer 155 or personal digital assistants 160 to remotely access the program database in the service center 130 by establishing a communication channel with the service center 130 via the computer network 140.

Figure 2:
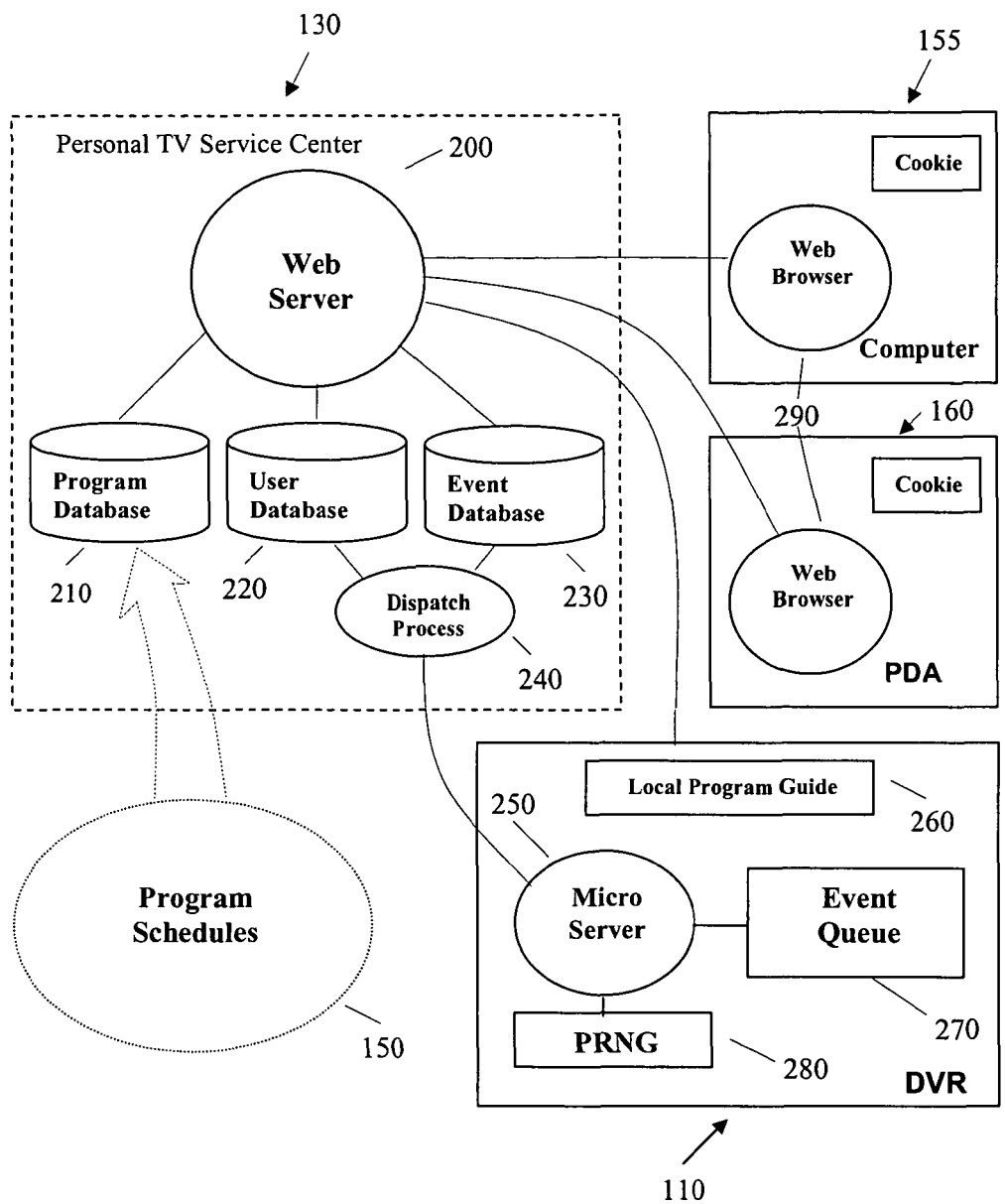
FIG. 2 is a data flow diagram showing the operational processes of the system shown in FIG. 1.

Referring to FIG. 2, the service center 130 includes a Web server 200, which collects, organizes, and provides program schedule information; a program database 210, which stores program schedule information; a user database 220, which stores information about users and digital video recorders; an event database 230, which stores an event list for each user, and a dispatch process 240, which traverses the user database and retrieves the event list from the event database. It may also include a network interface over which the Web server and the digital video recorder communicate.

In one embodiment, the DVR 110 includes a micro-server 250, which controls the communication between the DVR 110 and the service center 130; a local program storage guide 260, which records the program guide provided by the service center 130 and is updated whenever the DVR 110 accesses the service center 130; an event queue 270, which is a data structure used to initiate recording sessions that capture selected TV programs; a pseudo-random-number-generator (PRNG) 280, which generates an authorization key for remote access; as well as a network interface 125, which connects the DVR 110 to the computer network 140. The event queue 270 is coupled to a recording device integral to the DVR 110.

Both the remote computer 155 and the personal digital assistants (PDA) 160 comprise a Web browser 290, which may be a generic Web browser that enables the user to view Web pages.

Figure 3:
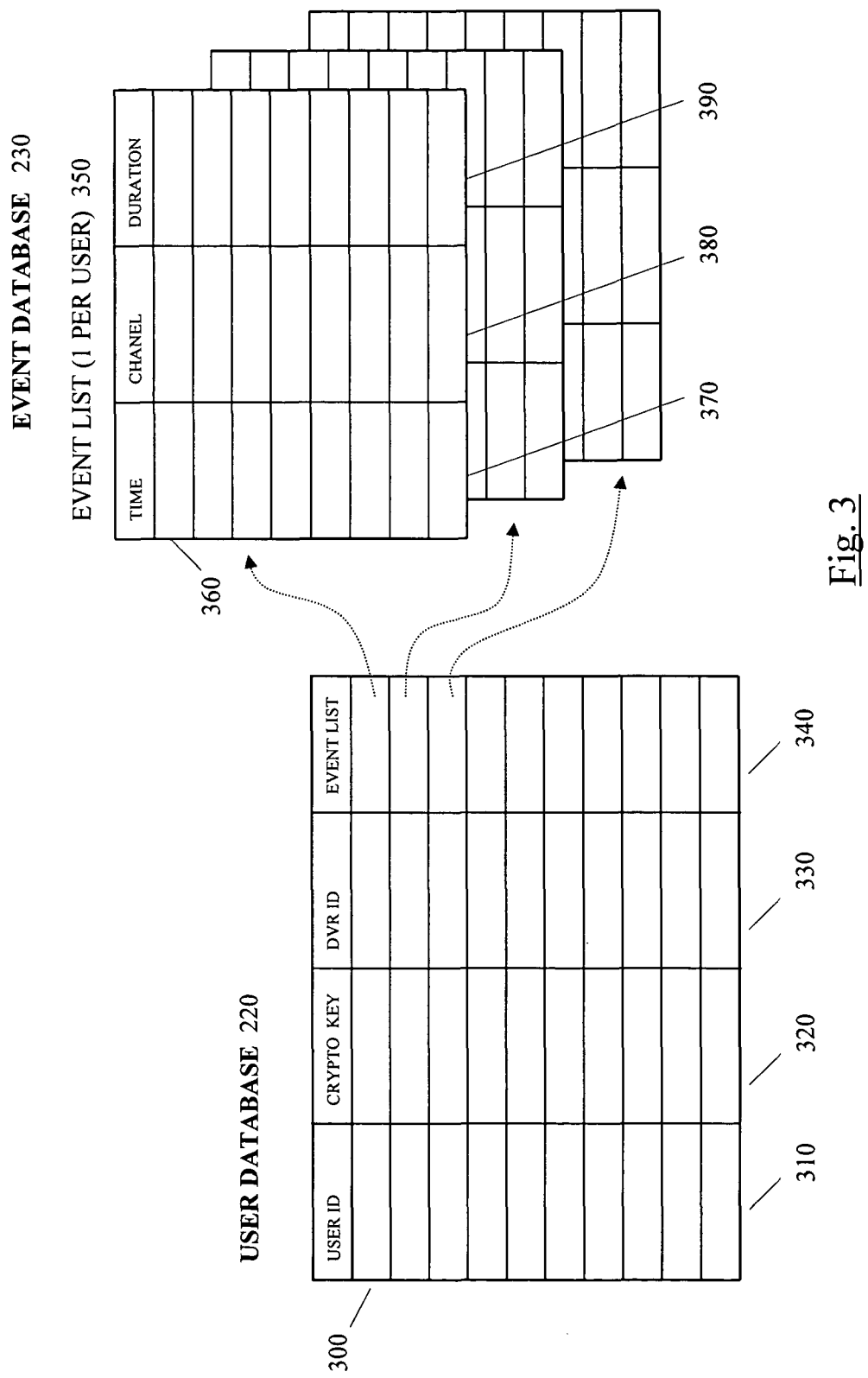
FIG. 3 is a table diagram illustrating the structures of a user database and an event database shown in FIG. 2.

FIG. 3 is a table diagram illustrating the structures of a user database 220 and an event database 230. The user database 220 includes a plurality of user records 300. Each user record 300 comprises a plurality of fields, among which are a user identification 310, a crypto-key 320, a DVR identification 330, and an event list pointer 340. The user identification field 310 is used as a key into the user database 220. The crypto-key field 320 is used to store the authorization key received from a user who is attempting to program his DVR 110 remotely. The DVR identification 330 is used to store the network address and connection details which are needed to establish a communication channel with the DVR 110.

In the user database 220, separate event lists 350 are maintained for each user. The event lists 350 are stored in the event database 230. Each event list 350 includes a plurality of event records 360. Each event record includes a plurality of fields among which are a time field 370, a channel field 380, and a duration field 390. The time field 370 is used to indicate a start time for recording and is comprised of the date and time of the program event. The channel field 380 specifies which channel the DVR should record. The duration field 390 is used to specify how long the DVR should record the content for that program event. An event record can also contain an ID of a record (or object) in the program guide database. The DVR retrieves necessary information from the program guide database.

B. Process for Remote Access to Personal TV Service

FIG. 2, together with FIG. 1, shows various processes that collectively enable the functionality of the techniques described herein.

The service center 130 receives program schedule information 150 from external sources on a periodic basis. Once the program schedule information 150 arrives, the program database 210 is updated accordingly.

The DVR 110 updates its local program guide 260 on a periodic basis by reading a Web page from the Web server 200 or via cable, satellite, or telephone. In response to a request from the DVR 110, the Web server 200 first consults the program database 210 for updated program information and then dynamically creates a Web page containing updated program schedule information.

Figure 5:
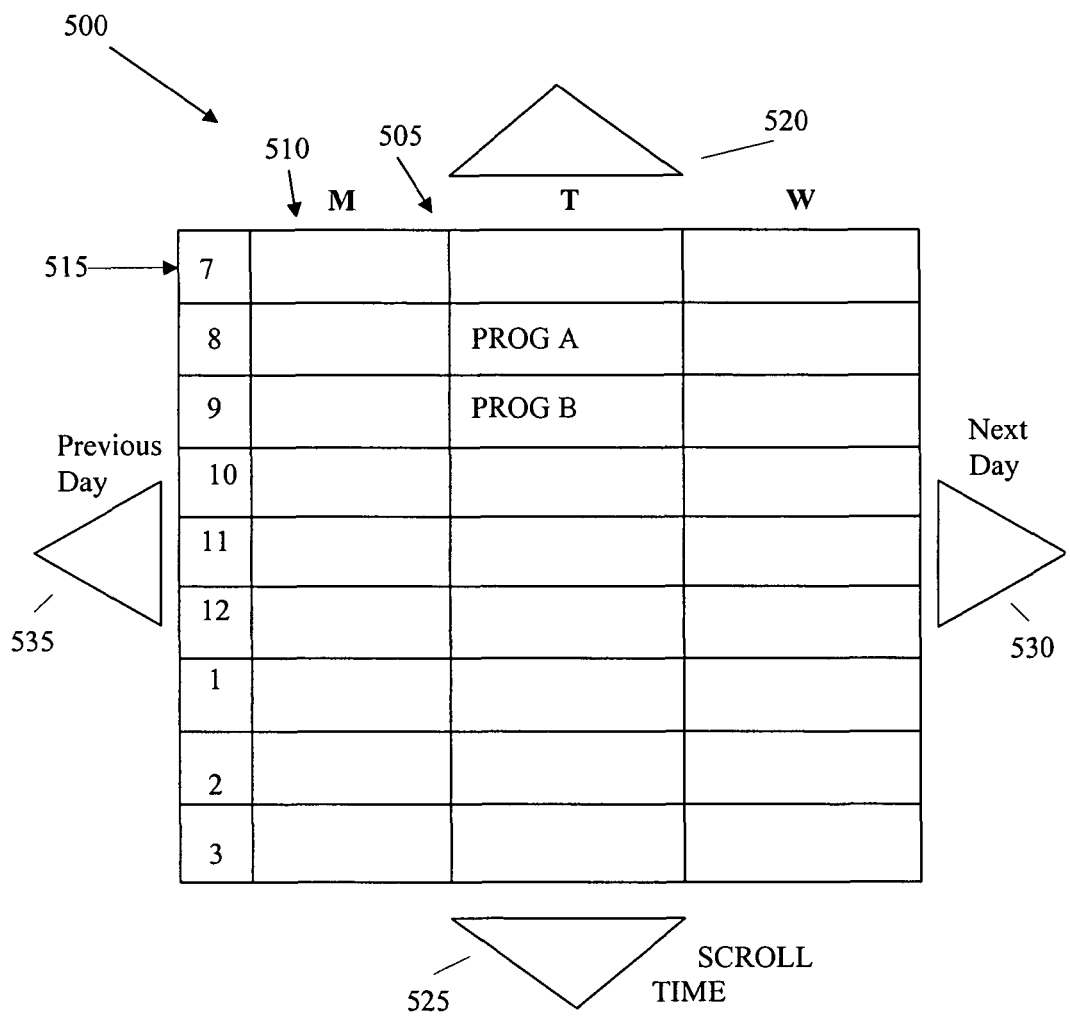
FIG. 5 is a pictorial representation of a graphical user interface for program selection.

Two types of remote access are available: direct and indirect. The TV viewer can indirectly program the DVR 110 by using a Web browser 290 on either a remote computer 155 or a personal digital assistant 160. In this situation, the Web browser 290 is used to access a special Web site hosted by the Web server 200. The Web server 200 presents to a TV viewer a program guide using a graphical user interface as shown in FIG. 5. The TV viewer selects TV programs by program title and time slot to indicate what programs should be recorded by the DVR 110.

The service center 130 executes a dispatch process 240 on a periodic basis. The dispatch process 240 traverses the user database 220. Whenever the dispatch process 240 encounters a user who has specified program events, the dispatch process 240 retrieves the event list 350 from the event database 230. The dispatch process 240 then establishes a communication channel with the micro-server 250 that resides in the DVR 110. This communication channel is designed to allow the dispatch process 240 to retrieve a special event-dispatch Web page from the micro-server 250. The micro-server 250 presents the event-dispatch Web page to the dispatch process 240. The dispatch process 240 then completes the event-dispatch Web page and submits it back to the micro-server 250.

The micro-server 250 can also cause the dispatch process 240 to start the event transfer by polling the dispatch process 240 for events.

The micro-server 250 uses event directives found in the event-dispatch Web page to update the event queue 270 integral to the DVR 110. The event queue 270 is a data structure used by the DVR 110 to initiate recording sessions that capture TV program events.

In order to authenticate a transaction, the Web server 200 includes one or more authorization codes for the user affiliated with the DVR 110 to be programmed. The DVR 110 compares the authorization code against a private copy maintained in the DVR's non-volatile memory. The authorization codes are time sensitive and can be set to expire as system security requirements dictate.

To use the direct remote access feature, a user must first obtain an authorization key from the DVR 110, which is generated by the pseudo-random-number-generator (PRNG) 280. The user communicates directly with DVR 110 via his television at the DVR's location. The DVR 110 presents the authorization key to the user. The user later accesses the DVR 110 through the Internet using his computer 155 or his PDA 160. The user presents the authorization key and programs the DVR 110 through a graphical user interface that is managed by the micro server 250. Also, once the user has access in direct mode, the user can download a program to the DVR 110.

C. Process to Obtain Remote Programming Directives

Figure 4:
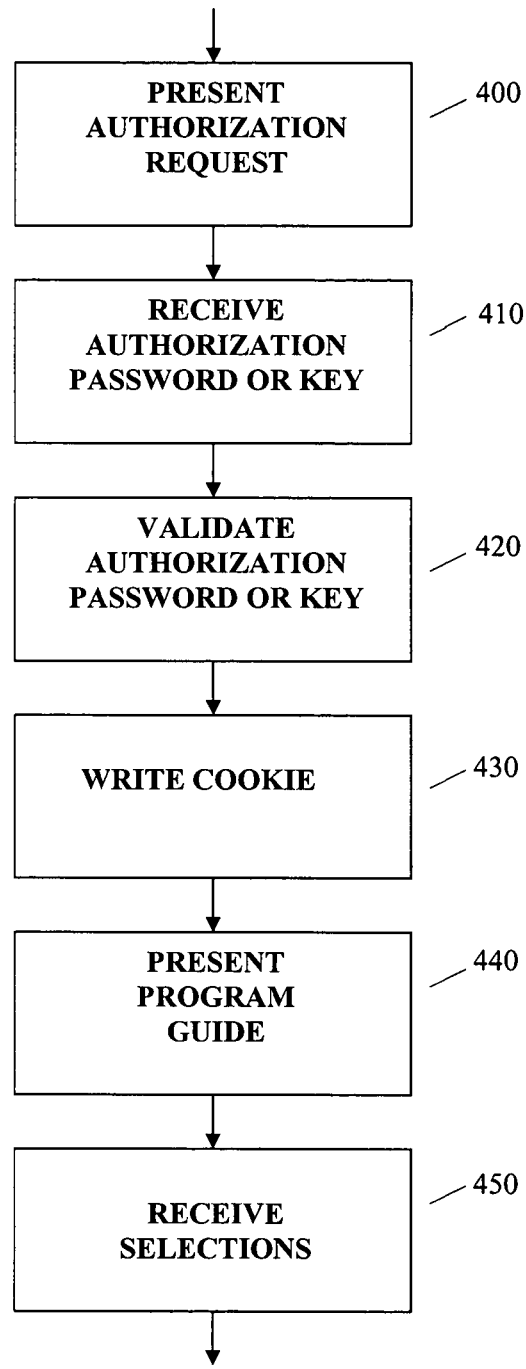
FIG. 4 is a flow chart showing a process used by a personal TV service's Web server to obtain remote programming directives from a user.

FIG. 4 is a flow chart showing a process used by the Web server 200 and micro server 250 to obtain remote programming directives from a user. Both are presented in parallel, but in normal use are separate processes. The process includes the steps of:

Step 400: The Web server 200 or micro server 250 presents an authorization request form in the first Web page to the user who accesses a special Web site that is managed by the Web server 200 or the micro server 250;

Step 410: The Web server 200 receives an authorization password entered by the user; the micro server 250 receives an authorization key from the user;

Step 420: The Web server 200 validates the authorization password using the user database 220; the micro server 250 validates the authorization key with the key that it has stored.

Step 430: Once the Web server 200 has validated the authorization password in the user database 220, it writes a cookie in the non-volatile memory of the remote computer 155 or personal digital assistant 160; once the micro server 250 has validated the authorization key, it writes a cookie in the non-volatile memory of the remote computer 155 or personal digital assistant 160;

Step 440: The Web server 200 or micro server 250 presents a program guide to the user after the user is identified and authenticated;

Step 450: The Web server 200 receives the user selections and creates an event list 350 specific to the user. The event list 350 is stored in the event database 230. The micro server 200 receives the user selections and places them on the event queue 270.

In Step 440, the Web server 200 or micro server 250 follows a script integral to the first Web site presented to the user and searches for a valid cookie on the remote computer 155 or the personal digital assistant 160. Once a valid cookie is discovered, steps 400 through 430 are excluded from the process flow.

D. Graphical User Interface for Program Selection

Figure 6:
FIG. 6 is a screen capture of a Now Showing Web page that appears in a user's web browser or television screen.

FIG. 5 is a pictorial representation of an exemplary graphical user interface (GUI) 500 for program selection. The GUI 500 is used both on the DVR front panel and is incorporated into the Web pages presented to remote users by the Web server 200. When implemented directly in the DVR 110, the GUI 500 is manipulated directly by the control process integral to the DVR 110. When the GUI 500 is presented to the remote users via a computer network, it embodies as an active server Web page. FIG. 6 is a screen capture of the Now Showing Web page that appears in a user's web browser.

The GUI 500 comprises a table 505 that contains a plurality of columns 510 and a plurality of rows 515. The columns 510 correspond to the days of the week (and a specific calendar date). The rows 515 correspond to the hours of a given day. The columns 510 and rows 515 of the table 505 are actually made up of data selection controls where the caption of the control is set to indicate the title of a TV program that is scheduled in the time slot according to the position of that control in the table 505. The GUI also comprises a mechanism for scrolling up 520 and scrolling down 525, a mechanism for turning forward 530 and turning backward 535; a mechanism for selecting a specific TV program; a mechanism for creating a program event list 350 which contains selected TV programs; and a mechanism for editing said event list 350. In addition, it may also include a mechanism for commanding download, a mechanism for indicating the download is in progress, and a mechanism for canceling the ongoing download.

The position of the control corresponds to the day and hour of the TV program event. The user can toggle the selection controls that are presented in the GUI 500. When the GUI 500 is returned to the Web server 200, the identifiers of the selected controls are used in conjunction with the program guide 260 to create an event list 350 for the user. The event list 350 is then stored in the event database 230 in the case of remote programming. For local programming of the DVR 110, the event list 350 is stored directly in the event queue 270 that controls the DVR recording sequence.

E. Internet Access to Digital Video Recorder

Figure 7:
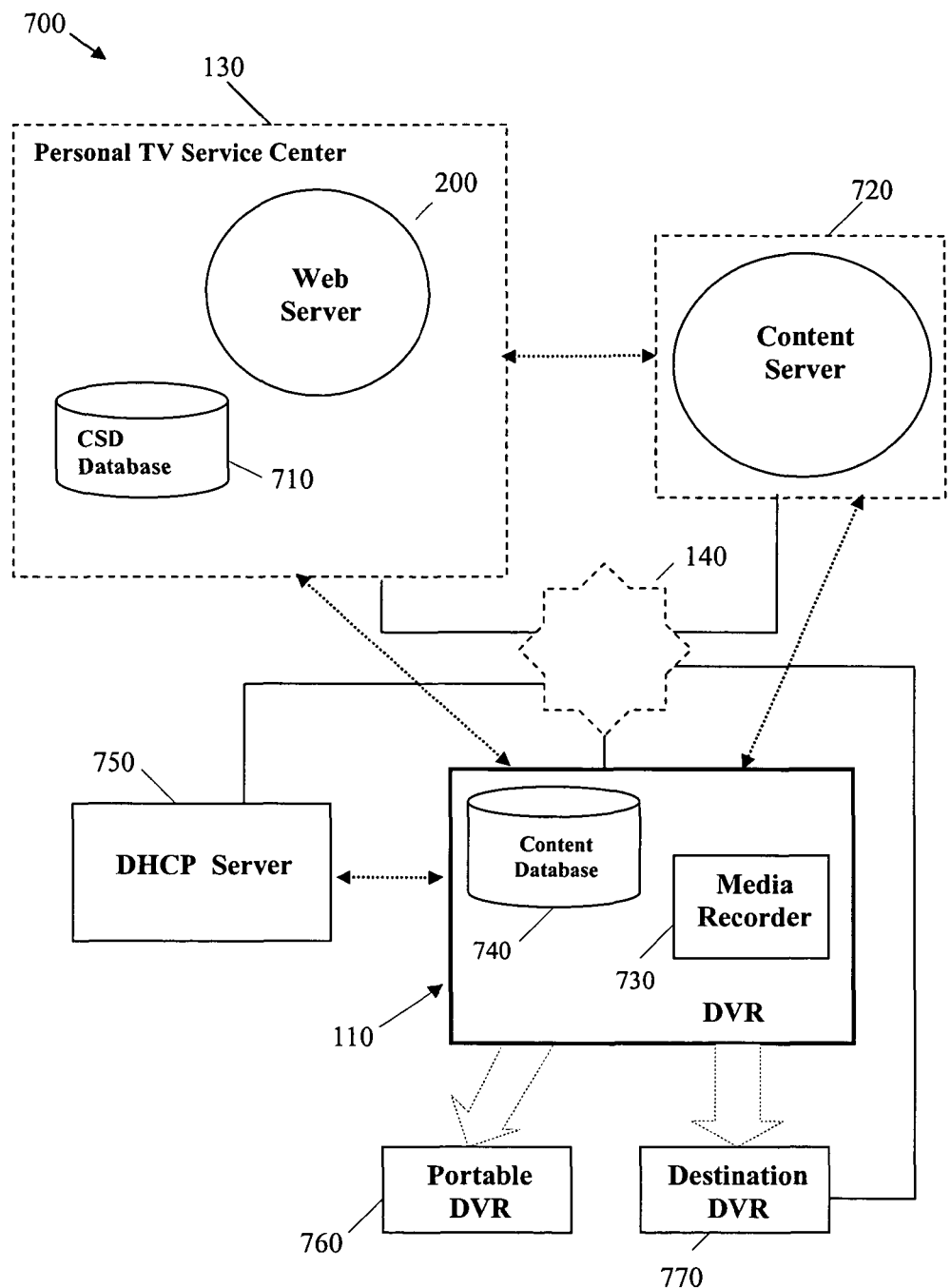
FIG. 7 is a block diagram illustrating the interactions among the personal TV service center, the DVR, and the external content server over Internet.

FIG. 7 is a block diagram of a general scheme 700 illustrating the interactions among the service center 130, the DVR 110, and the external content server 720 over the Internet, wherein a particular style of the Internet access is integrated into the DVR 110 to enable it to fetch certain types of content over an Internet connection 140 and make them available for viewing in the Now Showing page as shown in FIG. 6. For purposes of illustrating a clear example, FIG. 7 and the description herein refers to specific elements and protocols that may be used in an implementation, such as the Internet, Linux, DHCP, etc. However, other functionally similar elements or protocols may be used in alternative implementations. For example, downloading may occur through any public, private, or dedicated network rather than the Internet. Other operating systems and dynamic addressing protocols may be used.

In a Now Showing page, a listing of the content name, i.e., the title of TV program, indicates that such content is being fetched on the GUI 500, and a record icon, or some variant thereof, indicates that the download is in progress. The viewer may pick the content (i.e., the TV program) and play it at any time.

Figure 8:
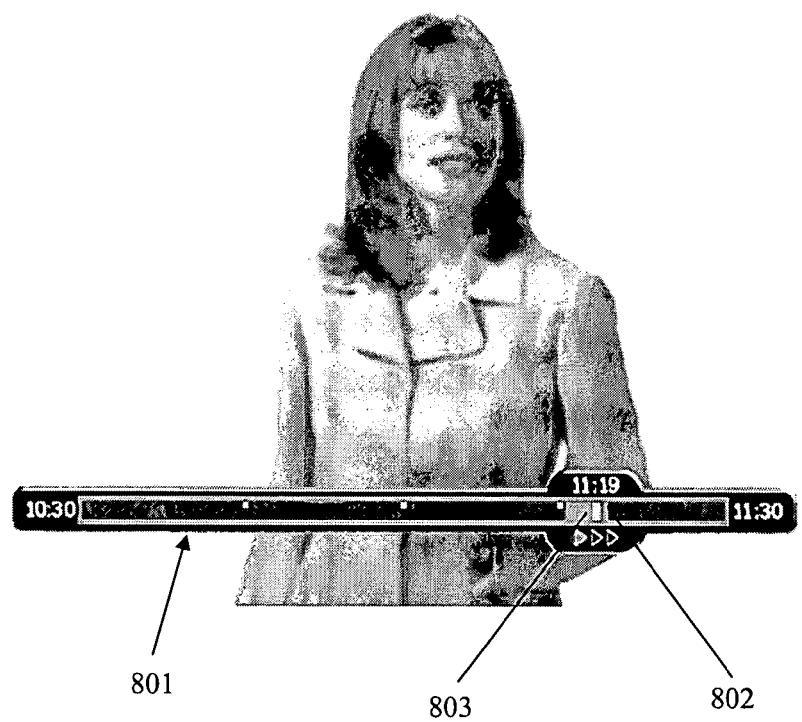
FIG. 8 is a screen capture of a replay bar indicating that the content is downloading faster than playback speed.

The download may occur at any speed. Thus, the interface 125 in FIG. 1 is not dependent in any way on speed of download. FIG. 8 is a screen capture of the Web page showing a replay bar 801 that, by growing the green region 802 to match, indicates that the content is downloading faster than playback speed 803. Other mechanisms than such a replay bar 801 may be used to indicate that content is downloading faster than playback speed. In any case, the viewer is able to use all trick-play actions on whatever amount of content has been downloaded to that point.

The fact that the content was downloaded over the Internet is transparent to the viewer, except in the context of presenting program information, where an indication that the content is from the Internet may be made in various ways.

Pointers to downloaded content are stored in a local content database 740 on the DVR 110 hard drive in an analogous manner to how broadcast programs are stored, such that all forms of searching and presentation properly display those programs and provide for their manipulation.

In channel or network oriented contexts, downloadable programs are presented in a manner analogous to broadcast programming. These contexts may have to be modified such that the channel or network "lineup" is presented in a sensible manner, since time and location are irrelevant for such programs.

The number of content items available in the Now Showing context as shown in FIG. 6 may make navigation unwieldy. Although not required for the initial implementation, this context may be modified to make navigation of many items simpler.

The entity providing the content from some servers may be viewed as a television network. Each unique server name indicates a channel. Here, a "server" is just a name on the network; it might map into any physical server anywhere in the world.

Once the content server 720 is contacted, the DVR 110 requests the media content according to the program identification given. This is mapped by the Web server 200 into a particular piece of content, which is then sent down the connection. Either the content server or the DVR may throttle the download speed.

If the viewer requests multiple downloads, the DVR 110 may choose several different ways to get the content; it may initiate multiple connections with a maximum limitation, or queue requests, or both.

In one approach, elements of FIG. 7 address security of the DVR 110. Opening up a network port leads to a large number of possible security breaches, revolving around the security of copyrighted content and protection of a customer's private data.

In one embodiment, standard Linux firewall support is used to manage this protection by automatically blocking access to all but a few, well-known ports (such as Web (HTTP) or discovery) in both directions of communication. The well-known ports are used by the application software of the DVR to contact the external content server 720 for downloading media content.

A dynamic addressing client software element, such as the Linux DHCP client, is provided in the DVR 110. On boot up of the DVR, if a network interface is detected, then the DHCP client uses the well-known port to obtain a network address for the DVR from a source of dynamic addresses. For example, the DHCP client of DVR 110 uses the DHCP protocol to poll for an external DHCP server 750. If no server is found, networking will be disabled. Otherwise, the DVR 110 will initialize its network parameters from the DHCP response.

One issue with such Linux firewall support is that the external DHCP server 750 is required to configure the Internet access information. It is well known that there are a large number of methods for reading data or redirecting the data flow on an Internet connection between two devices. One possibility is aliasing, in which a malicious DHCP server configures Internet access information in a way that enables a malicious host to enter and attack the DVR by using an alias server address.

To defeat attacks of this nature, in one embodiment all communication with the content server 720 is authenticated and encrypted. The content server 720 has access to the public key of the DVR 110, and the DVR has a copy of the public key of the content server 720. The DVR 110 has metadata content information about the content server 720 downloaded by the service center 130. The DVR 110 stores the metadata in its database 740 and relies on the data in the database 740 to operate. Using a certificate exchange, the DVR 110 and the content server 720 generate a one-time session key, and all further communication are encrypted using the session key. In one embodiment, the Blowfish algorithm is used for encrypted session communication. The public key of the content server 720 is distributed from the service center 130, which has also provided appropriate program guide references to the content server 720.

The service center 130 accepts descriptions of the content server 720. In one embodiment, such descriptions consist of server URLs, content descriptions, content identifications, "channel" descriptions, "network" descriptions, etc. These data are imported into a content servers description (CSD) database 710. A set of public keys for access to the content server 720 are also provided.

In order for the content server 720 to accept a connection from the DVR 110, it must have access to the public key for a particular DVR. This key distribution may be performed on-the-fly, or through a pre-shared key distribution approach. In on-the-fly key distribution, the content server 720 establishes an authenticated connection to the service center 130, provides a DVR serial number, and requests the service center 130 to provide the associated public key. Given a DVR serial number, the service center 130 returns an associated public key. The content server 720 may cache this public key. Each key has an expiration date that indicates when the content server 720 must delete the key. The service center 130 may maintain a log of all distributed public keys, for example, for the purpose of auditing key distribution.

The service center 130 may refuse to provide the public key of an inactive DVR. Additionally, the content server 720 may respond to key invalidation requests from the service center 130, for instance, if a particular DVR becomes inactive.

A media recorder 730 is a subsystem of the personal TV service application software of DVR 110. Media recorder 730 allows for simultaneous record and playback of the downloading content. The recorded content is stored in the content database 740 of DVR 110. The media recorder 730 will not be started if no permanent network connection is available. In one implementation, media recorder 730 comprises a number of different threads.

(1) Recording Queue Thread: This thread manages a queue of network download requests and implements the download policy. Initially, this may be a simple FIFO queue maintained in the database. A recording queue policy object is maintained once the download policy is implemented.

(2) Fetch Recording Thread: This thread is responsible for managing a connection with the content server 720. The Fetch Recording Thread contacts the server, implements the authentication protocol, requests the desired content, and manages download of the content.

As a variation on this strategy, a program object within the personal TV service application or media recorder 730 may indicate multiple servers to be polled for the media content. The servers are polled in order by the Fetch Recording Thread; the first to accept a request for download is used. This provides for load-balancing content requests across a plurality of content servers organized in a server farm or data center.

The Fetch Recording Thread periodically stores or checkpoints its state to an database in DVR 110. Such checkpointing allows restart of a download after a power failure or system error at the same point in the multimedia content at which download was occurring when the failure or error happened. The Fetch Recording Thread also manages the state of database objects that are used for presentation and navigation of the content being downloaded. For example, the Fetch Recording Thread manages the state of the recording object for proper display in the Now Showing context as shown in FIG. 6. There may be one or more such threads active at any point in time.

F. DVR to DVR Interactions

In one approach, a mechanism for transferring media and database elements between two DVRs is provided. Referring to FIG. 7, one example of a transfer is shown using a smaller amount of disk storage as provided in a portable DVR 760, for example. As an example, before going on vacation, a user may transfer desirable media and the invisible associated service data to the portable DVR 760 and take the portable DVR 760 along such that the media may be used when desired. Another example of a transfer is shown using two DVRs, DVR 110 and DVR 770, that are slaved together such that two media streams are played with precise synchronization to achieve identical operation.

There are many ways to connect two DVRs. In one embodiment, the output of the source DVR 110 is coupled into the input of the destination DVR 770. While this method is functional, this method fails to transfer metadata information about the media stream, which is essential to viewer satisfaction in managing and using the media stream.

The media stream stored in the DVR 110 consists of the media content itself, and a database object which provides descriptive information about the media content. If a data transfer method is used, such as a network (e.g., IEEE 802.3) or a direct connection (e.g., IEEE 1394), then both the media content and the descriptive information can be transferred, such that the integrity of the viewer experience is preserved.

Content owners are concerned about potential theft of their content. A further approach encrypts the data transfer between the DVRs 110 and 770. This can be done in a number of standard and custom ways. For instance, the Diffie-Hellman secure connection protocol may be used to generate a one-time key that is then used to encrypt the transfer.

If it is desirable to allow the transfer to only occur to certain specified DVRs, an integrated security system may be used. The public key of each DVR is known to the other, either through pre-sharing keys or a dynamic exchange of keys. When the transfer is started, the DVRs exchange signed certificates that are encrypted based on the public key of the other DVR. If both DVRs can decrypt and verify the signature of the other, then each DVR has authenticated the other's identity and can proceed to establish a one-time session key that is then used to encrypt the data during the transfer.

Key distribution in such a case may be handled through the service center 130. A viewer may contact the service center 130, and request that two DVRs 110 and 770 he owns be authorized for data transfer between each other. The service center 130 sends an authorization object containing each DVR's public key to the other DVR through an appropriate download mechanism. The service center 130 maintains a record of this operation for later auditing purposes, which includes identifying information for each DVR. For instance, should the security system be defeated in one DVR and the public key of the other be exposed, it is possible to modify other DVRs such that they appear authorized to the source DVR 110. Each DVR keeps a record of the transfers. This record is uploaded to the service center 130. Later, this information could be processed to look for copy protection violations, copies to unauthorized DVRs, etc.

If the transfer is interrupted, the destination DVR 770 marks the media stream as "partial" in the descriptive object. Later, the transfer may be restarted. Since the design of the database system guarantees the media stream can be uniquely identified on the destination DVR 770, the partial stream is found, and the transfer begins from its end, thus avoiding re-transfer of media that has already been stored. Once the entire media stream is stored, the descriptive object is updated to show a complete media stream.

Transferring digital data between the DVRs may take place at whatever speed is appropriate. For instance, it may be the case that the network between the DVRs is slow, in which case the transfer duration will be longer than the playback duration of the content. Alternatively, the network may be fast, in which case multiple media streams might be transferred in much less time than taken for playback of one content item. The viewer on the destination DVR may start viewing the media stream as soon as the first portions are available, in parallel with the ongoing download of the stream.

There is no requirement that the source or destination DVR be a complete digital video DVR. For instance, the media streams stored on a server in a cable head end may be transferred reliably to the destination DVR 770. Alternatively, the media stream stored in the source DVR 110 may be transferred to a head-end server.

For example, a PC can use a USB dongle containing the crypto chip from the DVR. The PC establish a secure mechanism for transferring content to and from the PC. The PC would appear to be a DVR to other DVRs, because it would use the USB dongle to authenticate and generate encryption keys. Content can then be stored on the PC in encrypted form. The content can be emailed to other PCs or DVRs. The other PCs must have a USB dongle to decrypt the content. Certificates that are passed from the service center 130 to the PC are stored in NVRAM on the USB dongle so the certificate moves with the dongle and is not stored on the PC's hard drive.

Certain media distribution architectures, such as digital satellite systems, broadcast most media content in an encrypted state. Using a local decryption facility based on a smart-card, the media content is decrypted only if it is viewed, thus protecting the content from theft. It is possible for the DVR to save these encrypted media streams to disk, and to initiate decryption upon playback. This method may be used to transfer media streams between two DVRs. In order to properly comply a particular set of content protection rules associated with the media stream (such as play once, expire after one day, etc.), the DVR maintains with the database object describing the media stream the copy protection information associated with the media stream (including whether the stream is stored encrypted).

The content protection rules associated with the media stream may be transferred to the destination DVR 770 as well. For example, the DVR 110 may have stored a movie from the content server 720 that will not be decrypted until it is viewed. If the viewer wishes to have this media stream transferred, it is copied into the media region of the destination DVR 770, and the descriptive object is transferred as well. In this approach, the original information in the media stream is faithfully duplicated to the destination DVR 770.

The smart-card might be pulled from the source DVR 110 and installed in the destination DVR 770. When the media content is viewed, the viewer is properly charged and all copy protection rules followed. The original media content and descriptive information might, or might not, be removed. For instance, in a "view-once" scheme, the originals are destroyed, whereas in a "charge-per-view" scheme, they are not.

Using the same techniques as described above, a secure, or authenticated and secure, connection may be established between two or more DVRs using a network or modem connection. Establishing such a connection enables control interactions to take place. Some examples of control interactions that may be provided in various embodiments are:

(1) Synchronized playback. A viewer may control trick-play features on a particular media stream. Each key event is also passed to the destination DVR 770, which automatically performs the same action. For example, a presenter may give a live presentation using the source DVR 110 as a multimedia playback device, and an audience at a remote location can watch the same presentation given in the same way at the same time. Alternatively, two viewers communicating through some other means, such as a telephone, may interact, while one or the other controls the playback on both DVRs of the same program. This alternative approach allows precise discussion of the program of interest. The means of communication may be a simple chat program overlaid on the display in which the participants type comments. Such an approach may be used for business presentations as well as for entertainment purposes.

(2) Link passing. A viewer of the source DVR 110 may indicate that a particular program shall be linked to the destination DVR 770. In response, the source DVR 110 sends a message to the destination DVR 770 which causes the destination DVR to schedule recording of the linked program. Alternately, the program may be unlinked as well. A message for linking or unlinking may contain only the program identification, assuming both DVRs 110 and 770 are in service. If the destination DVR 770 is not in service, then the message for linking may contain additional metadata.

(3) Sound or graphics effects. When the viewer takes an action, such as pressing a particular key sequence, the source DVR 110 may play a sound or present a graphic. The source DVR 110 also may pass that event to the destination DVR 770 which reproduces that same sound or graphic, or a different sound or graphic associated at the destination DVR 770 with the action that was taken. For instance, a child may add sounds to a program this way, which may be replicated for his friend on a remote destination DVR 770. Such communication may be multi-way.

In another approach, DVRs may transfer other types of data as well. For example, consider a large home DVR 110 and a smaller portable DVR 760. Data such as software, graphical elements, program guide data, etc., may be transferred between the two DVRs. For instance, the portable DVR 760 may be updated or data synched by the home DVR 110 every time the two DVRs are connected. The update may include transferring and installing a software update, synchronizing program information, synchronizing recording schedules, etc. The synch is much like a PDA where the portable DVR 760 may tell the home DVR 110 to delete a program because the user has already viewed it. The portable DVR 760 transfers any operational information to the home DVR 110 whenever two DVRs are connected, and the home DVR 110 then sends the operational information to the service center 130 whenever the home DVR 110 accesses to the service center 130.

The update may be done automatically. In such a case, when two DVRs are connected, a set of pre-configured actions are performed, such as updating program guide or software, and then media streams may be transferred as well.

If the destination DVR 760 is a smaller portable unit, then not all media streams would fit. In this case, the viewer may explicitly choose which media streams to transfer. Alternatively, application software in the source DVR may use preference information to select a subset of the available media of most interest to the viewer and transfer only those streams. In another alternative, media streams are transferred going from newest to oldest, stopping when no more will fit, or oldest to newest. A season pass (where all showings of a program on a channel are recorded) may include a marker that DVR to "always transfer" or "never transfer". Another criteria may be whether the program was explicitly picked or chosen based on viewer preferences. Any program information stored in the descriptive object for the content may be used in the selection criteria, such as length, actors, rating, etc. The criteria can trigger actions such as "always transfer".

G. Network Security Schema

As mentioned above, one approach herein provides a secure encrypted data transfer between DVRs 110, 760, 770 or a content server 720 and a DVR 110, 760, 770. The approach allows users to record a program on one DVR 110, and then watch the program on another DVR 770.

The encrypted data transfer system described herein makes it very difficult to transfer videos from a DVR to any incompatible system, or to a system outside the location of the first DVR. Accordingly, users may exercise reasonable Fair Use rights to the recordings that they have made, but the approach makes it difficult for users to 'pirate' videos, or send premium content to their friends in violation of Fair Use principles.

Various embodiments of the approaches herein may include the following aspects:

Recordings are encrypted. Many recordings are encrypted when they are initially recorded. Those recordings that are not encrypted may be encrypted before being transferred from one DVR to another. This makes it difficult for anyone to "sniff" the recording data as it travels through a home's network and to make a copy of the data.

When an encrypted recording is transferred from one DVR to another, the receiving system cannot use the recording unless the sending system also transfers the encryption/decryption key associated with that one recording.

A DVR may discover other systems from which it might transfer recordings via an IP broadcast mechanism or other network discovery protocol. In such discovery protocols, discovery packets typically do not leave the local IP subnet. In the residential environment, a local IP subnet comprises a home's LAN. Additionally or alternatively, if there is a concern that a user will try to share recordings with other users, then application software of the DVR provides no mechanism which would allow the system's owner to type in or otherwise manually specify the IP address of a system located elsewhere on the Internet.

A DVR may only send a recording encryption key to another DVR, if the receiving system is "authorized" to view that recording. For example, in this context "authorized" may mean that the destination DVR is in the same household or is registered by the owner as authorized. The key transfer is performed using a robust public/private key system—in which each key transferred is intelligible only to the one system to which it was sent.

The authorization is done via a digital certificate, which lists the specific systems known to be part of one household or owned by a single user. The certificate includes the public keys of the systems, and is "signed" by the service provider. Each system verifies the signature on the certificate it is using, and also verifies its own identity against that contained in the certificate, before transferring any data or keys to any other system.

The certificate system can be based on the ElGamal public/private key system and on the Blowfish symmetric block cipher, which includes self-checking that would block attacks such as "change a system's serial number" or "copy a certificate to a different system" or "alter a certificate".

Figure 9:
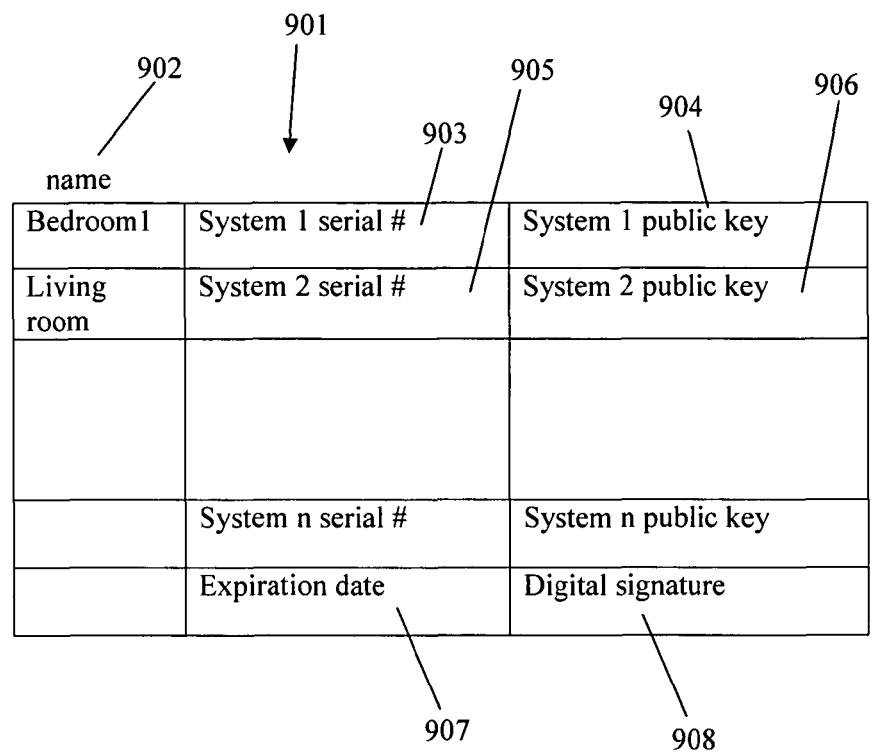
FIG. 9 is a diagram illustrating a digital certificate containing DVR information.

Referring to FIGS. 7 and 9, a user logs onto the service center 130 to create a record of the DVRs that he wants to share content between. Using any appropriate user interface, the user enters the serial numbers of the DVRs that he wants included, which the service center 130 verifies through its database, or the service center 130 finds the serial numbers that the user has previously registered. The service center 130 can also restrict the user to only the DVRs that he is a registered owner of by displaying only those DVRs for selection. The user can associate a name with each unit, e.g., living room DVR, bedroom, etc., to allow the user to easily identify a unit. The user selects the units that he wants to share or transfer media with.

The service center 130 creates a digital certificate 901 that identifies the user's units that he has selected. The certificate 901 includes each unit's serial number 903, 905, and the corresponding public key 904, 905. The name that the user has assigned to each unit is also cross referenced, as indicated by name 902 in the certificate 901. The certificate can contain any number of units that the user identifies, including PCs with USB dongles as described above.

To ensure that the certificate 901 does not exist indefinitely, an expiration date 907 is included in the certificate 901. A digital signature 908 is used so that units that receive the certificate can verify that the certificate actually originated from the service center 130.

The service center 130 sends the certificate to each DVR 110, 770, listed in the certificate 901 over the network 140 (which may comprise the internet, a LAN, or other public or private network), phone line, or satellite connection. The certificate 901 may be encrypted using the public key of each destination DVR 110, 760, 770. A portable DVR 760 can connect to the service center 130 via a network connection or phone line to receive its certificate. Alternatively, the portable DVR 760 can receive its certificate from a DVR 110 that it connects to.

Each DVR 110, 760, 770, verifies the certificate by decrypting the certificate and verifying the digital signature 908 in the certificate 901. Once the DVR has verified that the digital signature 908 is from the service center 130, the DVR finds the network locations of all peers that are listed in the certificate 901, using a peer discovery protocol, such as Rendezvous from Apple Computer Inc. of Cupertino, Calif.

Once a DVR 110 has discovered a peer 770 in the network, it sets up an encrypted connection with the peer 770 using the peer's public key from the certificate 901. The encrypted connection may be "weakly" encrypted in that it is a function of two public keys, one from each peer. Each peer sends a message using the other's public key. A unit is designated as the content server, in this example, the content server 720 is provided by the service provider and is remotely located.

The content server 720 creates a more strongly encrypted connection with the DVR 110 by creating a random strong connection key and encrypts the strong key using the DVR's public key. The content server 720 then sends the encrypted strong key to the DVR 110. The DVR 110 decrypts the strong key. In one approach, decryption may use hardware decryption elements. The two systems now share a secure key.

The user can request sending certain recorded content to the DVR 110. When the content server 720 sends a previously encrypted recording to the DVR 110, it loads a recording key that was used to encrypt the recording from its database and encrypts the recording key using the strong key. The content server 720 sends the encrypted recording key to the DVR 110.

The DVR 110 decrypts the recording key using the strong key that it shares with the content server 720 and stores the recording key. The content server 720 sends the recorded content that it has stored locally to the DVR 110. The recorded content has already been encrypted when it was originally stored locally by the content server 720. The content server 720 sends the recorded content without decrypting the content.

The DVR 110 writes the recorded content directly to its storage device without decoding it. When the DVR plays the recorded content, it decodes the content on the fly. The approach described herein preserves the integrity of the recorded content because the content is in an encrypted state during transmission and is stored encrypted on the DVR, thereby preventing any unauthorized copying of the content.

If the content server 720 sends an unencrypted recording to the DVR 110, it creates a random recording key that will be used to encrypt the recording and encrypts the recording key using the strong key. The content server 720 sends the encrypted recording key to the DVR 110.

The DVR 110 decrypts the recording key using the strong key that it shares with the content server 720 and stores the recording key. The content server 720 sends the recorded content that it has stored locally to the DVR 110. The recorded content was not encrypted when it was originally stored locally by the content server 720. The content server 720 sends the recorded content, encrypting the content as it sends the content.

The DVR 110 writes the recorded content directly to its storage device without decoding it. When the DVR plays the recorded content, it decodes the content on the fly. The approach still preserves the integrity of the recorded content because the content is in an encrypted state during transmission and is stored encrypted on the DVR, thereby preventing any unauthorized copying of the content.

Figure 10:
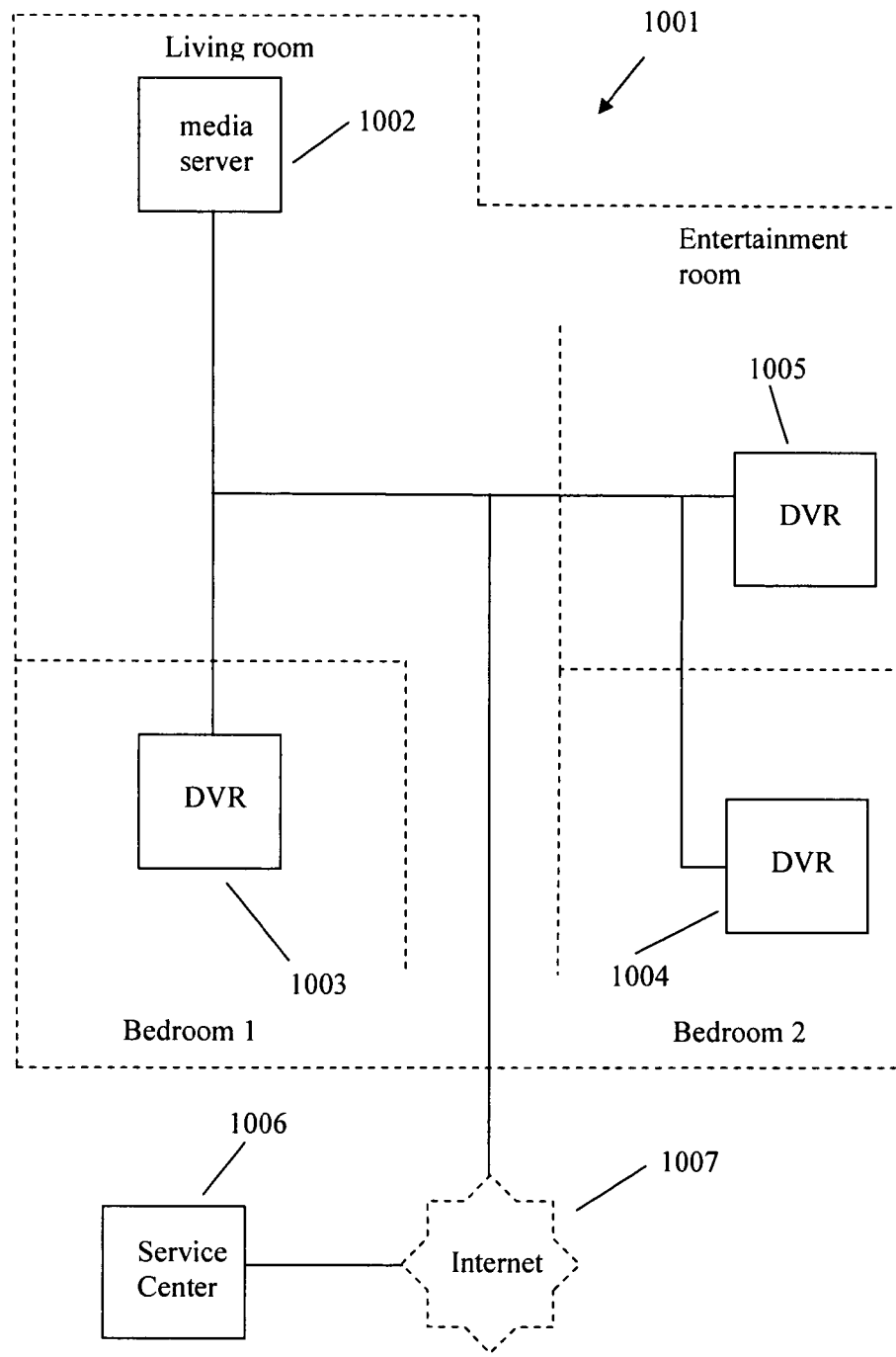
FIG. 10 is a block diagram illustrating a media server in a local network connected to DVRs within a home.

FIG. 10 shows a media server 1002 in a locally networked DVR setup in a house 1001. In the example of FIG. 10, DVR 1003 is located in Bedroom 1, DVR 1004 is located in Bedroom 2, and DVR 1005 is located in the Entertainment room. The media server 1002 resides in the Living room. The user sends information instructing the service center 1006 that DVRs 1003, 1004, 1005, and media server 1002 are authorized to share content and associates each unit by the room in which it resides. The service center 1006 creates a certificate 901 that contains the media server's 1002 and each DVR's 1003, 1004, 1005, serial number and public key along with an expiration date and the service center's digital signature.

The media server 1002 can be a PC, DVR, or other type of content server. The user designates the media server 1002 as the main source of multimedia content in the local network.

The service center 1006 sends the certificate to the media server 1002 and the DVRs 1003, 1004, 1005, via the Internet 1007. The media server 1002 and the DVRs 1003, 1004, 1005, use the information in the certificate to discover their peers. The DVRs 1103, 1004, 1005, discover that the media server 1002 is the only system that is serving content. Once the media server 1002 has established a weakly encrypted connection with each DVR 1003, 1004, 1005, it creates a random strong connection key for each DVR 1003, 1004, 1005. The media server 1002 encrypts each strong key using the particular DVR's public key and sends the encrypted strong key to each DVR 1003, 1004, 1005. The DVR uses its local crypto chip to decrypt the strong key. The media server 1002 now shares a secure key with each DVR 1003, 1004, 1005.

Figure 16:
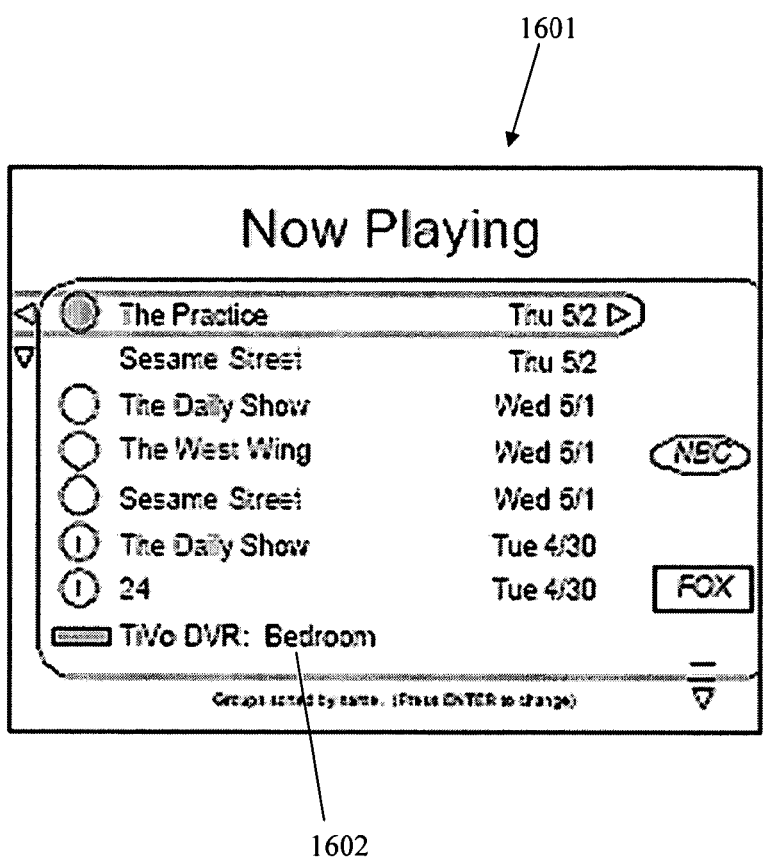
FIG. 16 is a screen capture of a Now Playing screen showing an accessible media server.
Figure 17:
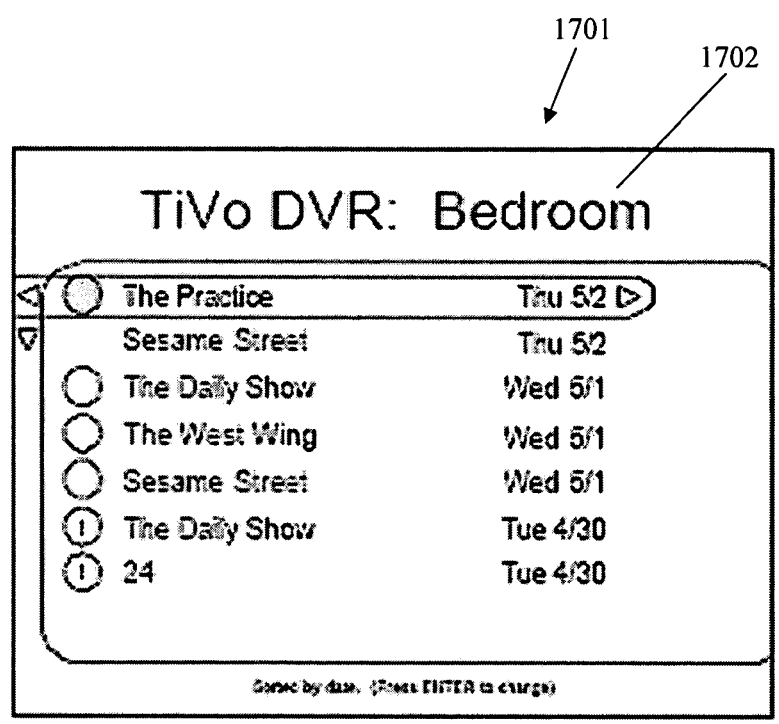
FIG. 17 is a screen capture of a content screen showing accessible content for a media server.
Figure 18:
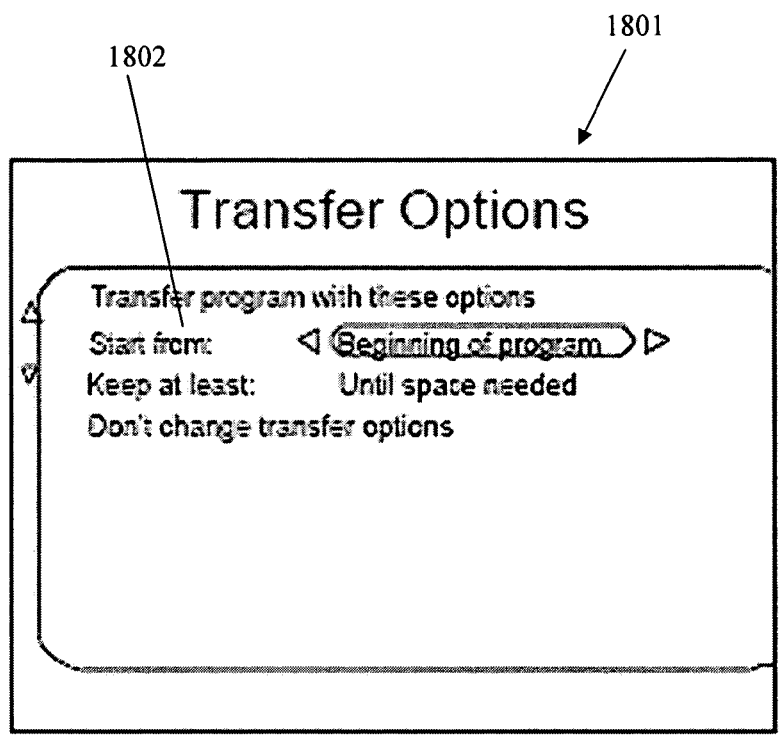
FIG. 18 is a screen capture of a transfer options screen showing for content from a media server.

Referring to FIGS. 16-21, each DVR has access to the media server's contents. Referring first to FIG. 16, the user goes to the Now Playing screen 1601 (which is the similar in format and content to the Now Showing screen in FIG. 6) and sees all media servers that the user can access. For example, a media server label 1602 indicates that the user can access the DVR named "Bedroom." The user selects the desired server using label 1602 and a content screen 1701 (FIG. 17) is displayed that lists what content the media server has available. The user can request that certain recorded content (music, photos, video, etc.) be sent to a particular DVR 1003 via the content screen 1701. The user can do this remotely as described above, or through the DVR 1003 itself. The user selects the options for transferring the selected content using a transfer options screen 1801 (FIG. 18). The user can select where to start the transfer from using a Start From option 1802. For example, the transfer can start from the beginning of the program, from where the user last paused, or at a certain time into the program. The user can view and transfer music content and photo content in the same manner, as indicated by screen capture 2001 of FIG. 20 and screen capture 2101 of FIG. 21.

As described above with reference to FIG. 10, the media server 1002 can send a previously encrypted recording to the DVR 1003. The media server 1002 loads a recording key that was used to encrypt the recording from its database and encrypts the recording key using the strong key. The media server 1002 can optionally encrypt the recording key for storage in its database using a local encryption key. It is normally not desirable to store any of the encryption keys in cleartext, so simple encryption with a local key is best. It sends the encrypted recording key to the DVR 1003.

The DVR 1003 decrypts the recording key using the strong key that it shares with the media server 1002 and stores the recording key. The DVR 1003 can optionally encrypt the recording key using a local key before storage. The media server 1002 sends the recorded content that it has stored locally to the DVR 1003. The recorded content has already been encrypted when it was originally stored locally by the media server 1002. The media server 1002 sends the recorded content without decrypting the content.

Figure 19:
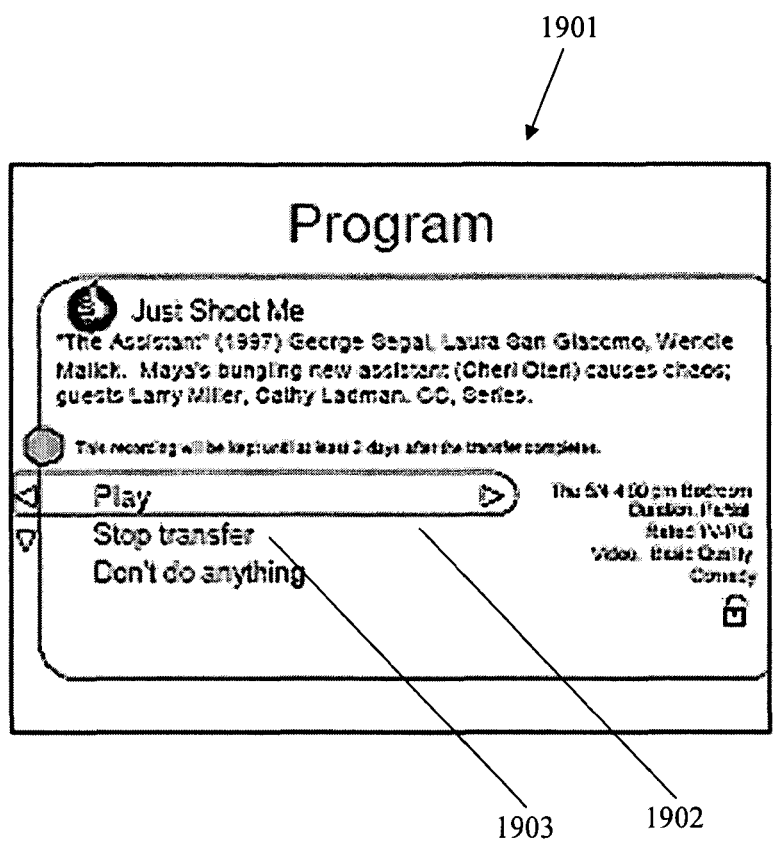
FIG. 19 is a screen capture of a program status screen showing a program being transferred from media server.

The DVR 1003 writes the recorded content directly to its storage device without decoding it. When the DVR 1003 plays the recorded content, it decodes the content on the fly using the recording key. Referring to FIG. 19, the user can select the program information screen 1901 to see if the program is still transferring. The user can play the program by selecting Play option 1902 while the transfer is in progress (as described above) or stop the transfer using Stop transfer option 1903.

If the media server 1002 sends an unencrypted recording to the DVR 1003, it creates a random recording key that will be used to encrypt the recording and encrypts the recording key using the strong key. The media server 1002 sends the encrypted recording key to the DVR 1003.

The DVR 1003 decrypts the recording key using the strong key that it shares with the media server 1002 and stores the recording key. The DVR 1003 can optionally encrypt the recording key using a local key before storage. The media server 1002 sends the recorded content that it has stored locally to the DVR 1003. The recorded content was not encrypted when it was originally stored locally by the media server 1002. The media server 1002 sends the recorded content, encrypting the content as it sends the content.

The DVR 1003 writes the recorded content directly to its storage device without decoding it. When the DVR 1003 plays the recorded content, it decodes the content on the fly using the recording key.

Note that if content copyrights are a concern, the DVR 1003 does not need to store the content on its storage device. It simply plays or displays the content immediately. If the content is encrypted, the DVR 1003 decrypts the content on the fly.

The approach described above performs equally well in a local network as it does across the Internet.

H. Preserving Certificate Coherency

Figure 11:
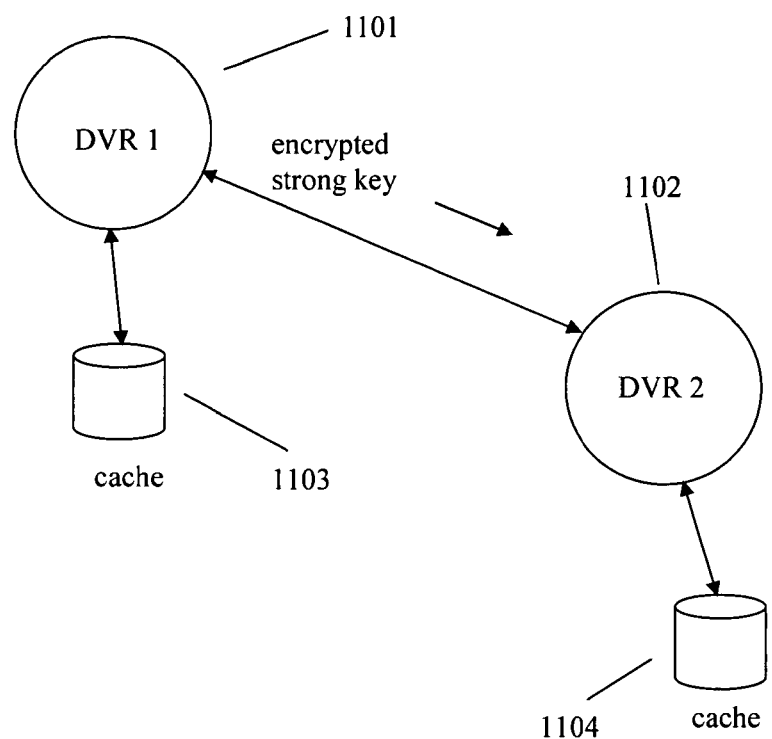
FIG. 11 is a block diagram illustrating a communication exchange between two DVRs to create a strong encrypted connection.

Referring again to FIG. 11, the creation of a strong key takes many CPU cycles. In one approach, DVR 1101 may be required to create and store a plurality of strong keys for future use at the time that it is designated as the media server. Further, the receiving DVR requires many CPU cycles to decrypt the strong key upon receipt. This significantly slows down the DVR's overall performance. The techniques herein save the DVR 1101 the added burden of creating a new strong key whenever a DVR 1102 reboots or is restarted. It also saves DVR 1102 the burden of decrypting the strong key after reboot or restart.

The DVR 1101 originally creates a strong connection key, stores it in its local cache 1103, and encrypts the key using the public key of the other DVR 1102. The DVR 1101 sends the encrypted strong key to the DVR 1102. The DVR 1102 decrypts the strong key and stores the key in its local cache 1104 along with the encrypted strong key and the machine serial number of DVR 1101.

If the DVR 1102 reboots or is restarted, it does not know what its status is in the network. It may have been down for a few seconds or it may have been transplanted from another network. The DVR 1102 requests the strong key from the DVR 1101 designated as the media server. The DVR 1101 sends the strong key that it has stored in its local cache 1103, or if the DVR 1102 has not had a strong connection established with the DVR 1101, creates a new strong key. The strong key is encrypted using the public key of the DVR 1102 and is sent to the DVR 1102.

When the DVR 1102 receives the encrypted strong key, it checks the local cache 1104 for an entry from the DVR 1101 and, if it finds one, it does a bitwise comparison with the encrypted key in the local cache 1104. If the two keys are the same, then the DVR 1102 uses the previously decrypted key stored in the local cache 1104. Otherwise the DVR 1102 decrypts the newly sent key and stores the encrypted key, decrypted key, and DVR 1101 machine serial number in a new entry in the local cache 1104. This way the long decryption step is avoided except when absolutely necessary.

I. Internet Media Downloading

Figure 12:
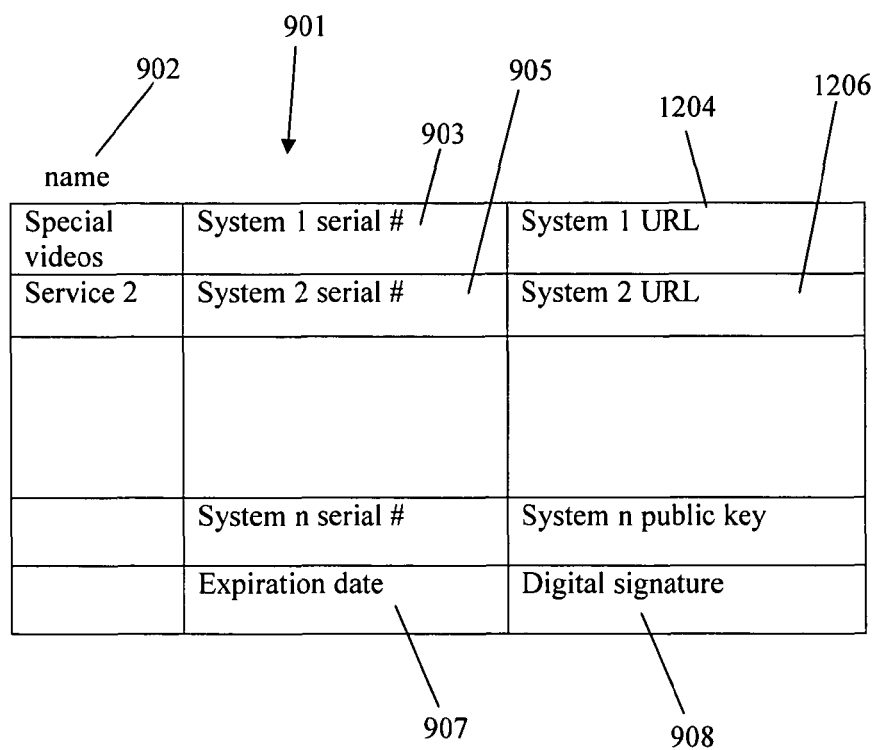
FIG. 12 is a diagram illustrating a digital certificate containing DVR and content server information.

To facilitate Internet media downloading from a server to a DVR, FIG. 12 shows a modification of the digital certificate shown in FIG. 9. Also, referring again to FIG. 7, the service center 130 creates the certificate 901 which is distributed to DVRs 110, 770. The DVR 110, 770 will recognize a service entry using a specially-prefixed serial number in the service's serial number field 903, for example: FFFxxxxxxxxxxxx, where the "xxxxxxxxxxxx" is used to provide additional information, such as version numbers, service provider, etc. The display name 902 is set to something indicative of the service, such as "Special Videos". Instead of a direct public key, the key field 1204, 1206 is filled in with a fully qualified domain name of the access point for the server.

The certificate 901 can contain a mix of service server information and peer unit information. The expiration date 907 and digital signature 908 remain the same.

Thus, the service center 130 can place information in the fields in all, or a group, of certificates to name the same or different servers, etc.

A DVR 110 recognizes the service serial number in the certificate and sends a ping to the server using the domain name in the key field, for example, the key field 1204, to see if it is reachable. When a new DVR connects, the server looks up the DVR's public key and uses that to generate any other needed keys. The DVR does not need to possess a key for the server; the server generates the strong key for the session and encrypts the strong key with the DVR's public key. It then passes the encrypted strong key to the DVR.

Once communication is established the DVR 110 can then query the server for content.

The server synthesizes the appropriate metadata to describe what it has available and sends it to the DVR 110. Since the metadata is synthesized, it can be uniquely created on a per-DVR basis. For example, a DVR owner may sign up for different kinds of services, such as history, drama, comedy, etc.

Alternatively, the server can instruct the DVR 110 to send its preference vector to the server, which the server uses to synthesize the appropriate metadata. The DVR's preference vector contains the user's viewing habits, e.g., what the user has indicated that he does and does not like, what he has consistently recorded using options such as a season pass subscription. The server does not store the preference vector information; it simply discards the information after use. This preserves the user's privacy and makes sure the preferences are always kept on the DVR 110.

Figure 20:
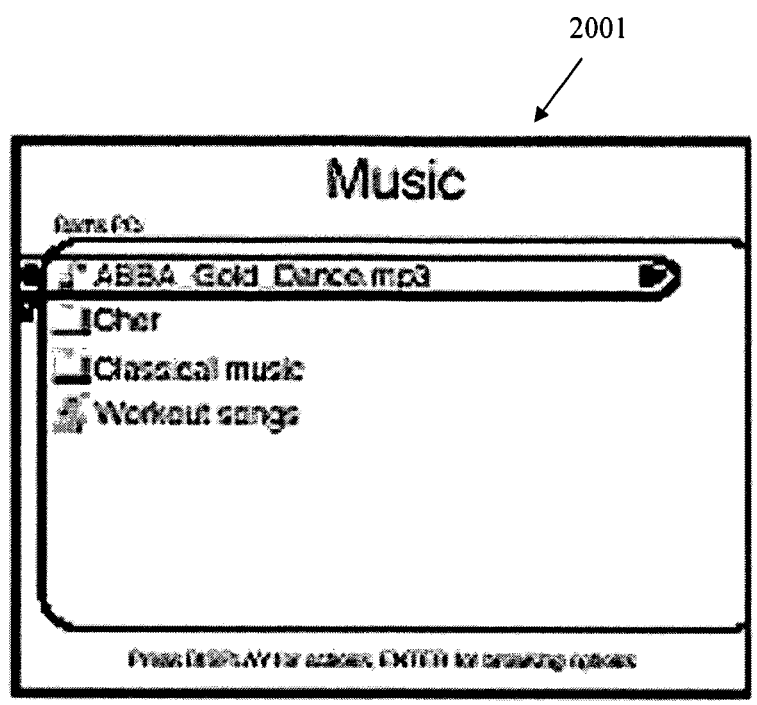
FIG. 20 is a screen capture of a music screen showing accessible music from a media server.
Figure 21:
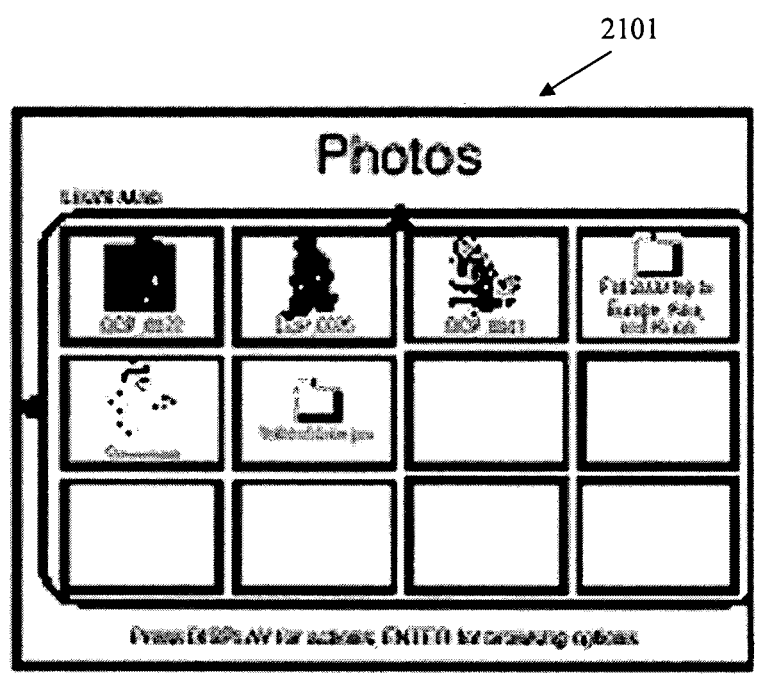
FIG. 21 is a screen capture of a photo screen showing accessible photos from a media server.

The standard video, music, and photo transfer interface is used as described above. FIG. 16 shows a Now Playing screen 1601 where available content from the DVR itself and other accessible servers and DVRs are displayed 1602. An entry for content from a service has its associated name from the certificate listed. In the same manner, content from another DVR is listed using the name 1602 that the user has associated with it, if any exists. This way, the user knows the source of the content. FIG. 17 shows the content screen 1701 displaying the name of the content source 1702. FIGS. 20 and 21 show a music content screen 2001 and photo content screen 2101.

Figure 13:
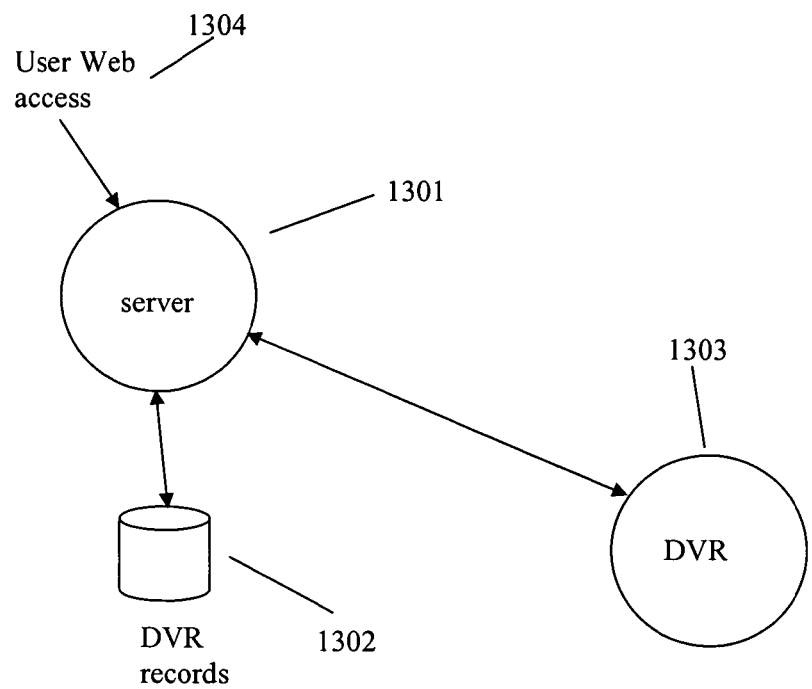
FIG. 13 is a block diagram illustrating a server recording DVR access information for billing purposes.

Referring to FIG. 13, DVRs that are interested in downloading content from a server 1301, ping the server 1301. The server 1301 runs the ping service, responding to requests from DVRs as they come in. This allows the server 1301 to maintain a record 1302 of all DVRs that are "signed up" to download video. The record 1302 can later be audited to ensure, for example, that there are no clones of DVRs accessing the downloadable video from another IP address. The record 1302 can also be used for billing purposes to track the length of time a user has his DVR 1303 signed up to download video.

When the user selects an entry from a server 1301 to transfer to a DVR 1303, the DVR 1303 contacts the server 1301 and requests the appropriate media object. At that point, the server 1301 can record 1302 that the program is being downloaded, which may also include an entry into a billing system, etc.

The records can be queried on the service center's Web site by a user 1304 so he can easily check his bill.

Figure 14:
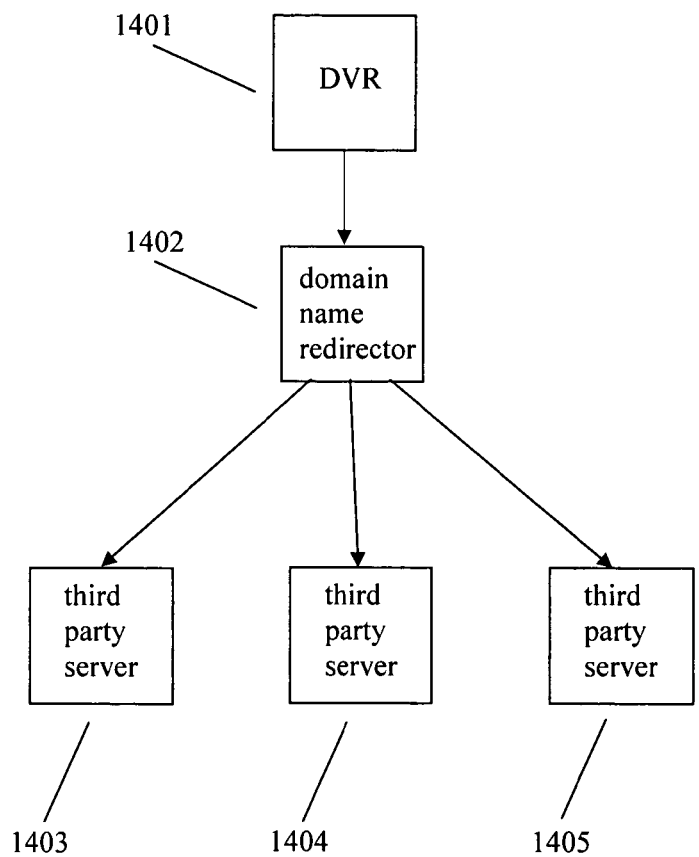
FIG. 14 is a block diagram illustrating a domain name redirector that redirects a DVR request to a third party server.

Referring to FIG. 14, a domain-name redirector 1402 can be used that redirects a connection from a DVR 1401 to one of a group of third party servers 1403, 1404, 1405. Redirection may occur based on load, the domain-name prefix used, etc. This allows the service center to redirect a request to another company's server. Redirection may involve a fee or revenue share in various embodiments.

A domain name redirector 1402 can reside on each third party server 1403, 1404, 1405, so a request from a DVR 1401 can be redirected by the third party server itself. The DVR 1401 requests a connection with third party server 1403. Third party server 1403 "delegates" its responsibilities to third party server 1404 by redirecting the request from the DVR 1401 to third party server 1404. DVR 1401 then contacts third party server 1404 for its content requests. This allows a third party server to judge by itself if is overloaded or cannot handle a request for any reason.

J. Using a DVR as an Encryption Pipeline

Figure 15:
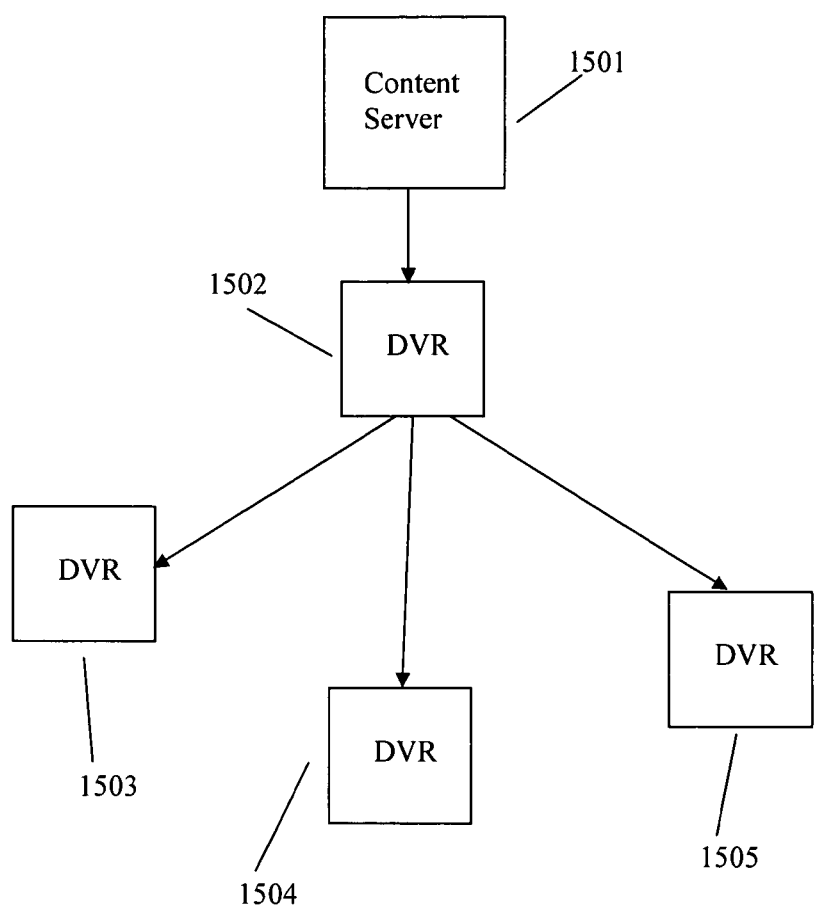
FIG. 15 is a block diagram illustrating a DVR being used as an encryption pipeline for a third party content server.

Referring to FIG. 15, content to be provided to a DVR 1503, 1504, 1505 can initially be produced by a content server 1501, such as a third party content server. The content server 1501 does not have access to any information about the DVR's encryption techniques or architecture. A DVR 1502 is used to encode and encrypt the content. The DVR 1502 has a fast network engine and functions as an "encryption pipeline". Data is sent from the content server 1501 to the DVR 1502. The DVR 1502 encodes (if needed) and encrypts the data while writing the data to its local storage device. The DVR 1502 then reads the data from the local storage device without decrypting, and sends the data over the network to a target DVR selected from among DVR 1503, 1504, 1505.

Another approach provides the third party content server with secure transmission of its content. Data is sent from the content server 1501 to the DVR 1502 using the content server's encryption technique. The DVR 1502 decrypts the data using the content server's decryption technique. The DVR 1502 then encodes (if needed) and encrypts (using the DVR's encryption technique) the data while writing the data to its local storage device. The DVR 1502 then reads the data from the local storage device without decrypting, and sends the data over the network to a target DVR selected from among DVR 1503, 1504, 1505.

This ensures that a third party content supplier does not have access to any sensitive information about the DVR crypto chip, encryption techniques, or addressing schemes. It further reduces the time to market and cost of incorporating third party suppliers into the content server network.

K. Accessing Content Via Email

As described above, the media server in any of the foregoing embodiments can be a PC, DVR, or any other mechanism that can serve content. The approaches described herein allow the DVRs, as clients of the media server, to access multimedia content such as music, video, and photo content stored on media servers. However, because the DVRs and media servers may have access to the Internet, the content need not originate nor be physically housed on any given media server.

Accordingly, content can be made available to DVR users by arranging for a server to process a special file containing:

Actual content (in the form of JPEG, MP3, or MPEG files, for example).

DVR configuration settings, for example, recording schedules, database modifications, content preferences, etc.

"Links" to another server or to the content stored on another server, located potentially anywhere on the Internet.

Such files can be provided to the DVR users via email or Internet download. Two example scenarios are described below that demonstrate how content can be sent via email to a DVR.

Figure 22:
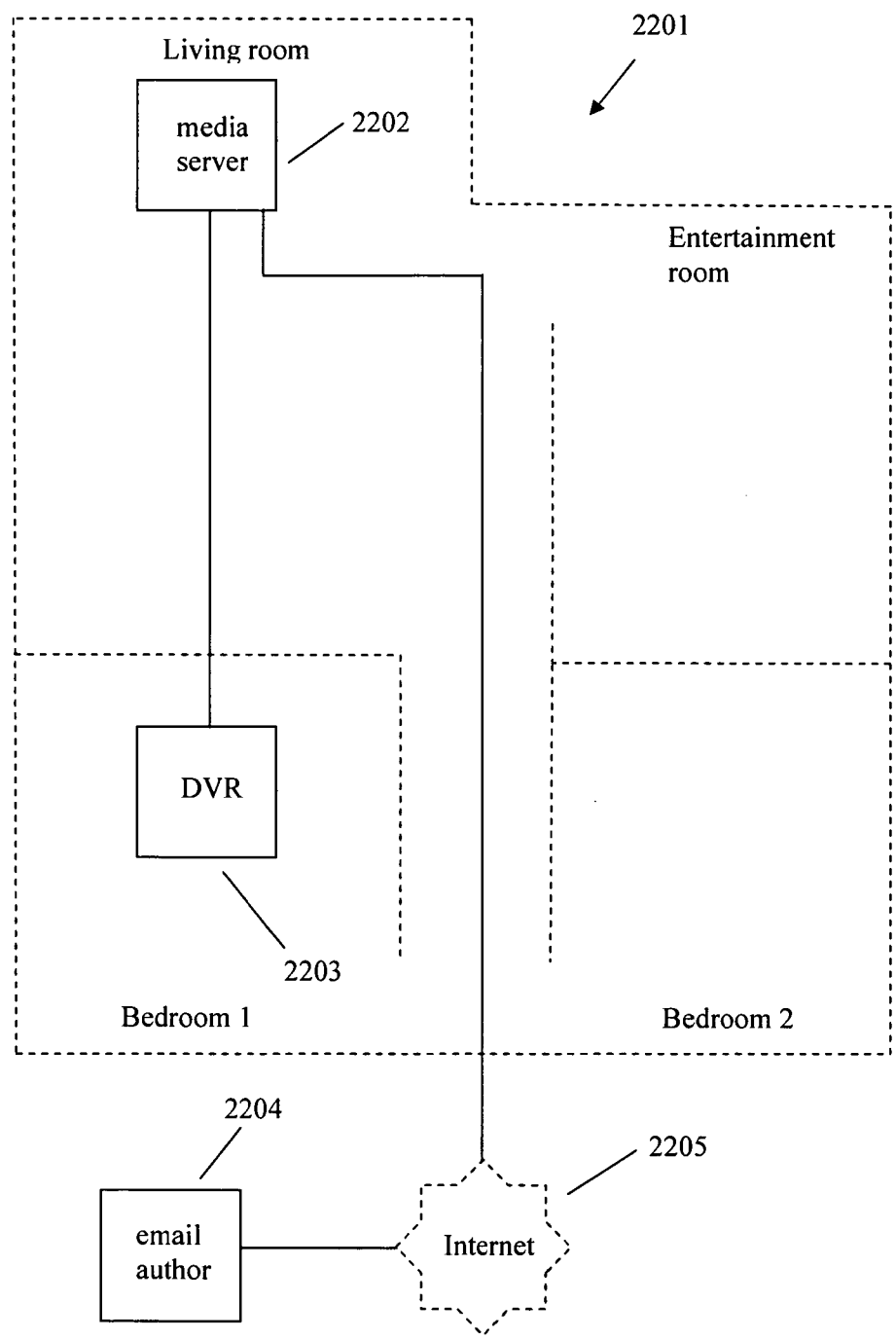
FIG. 22 is a block diagram illustrating a media server in a local network connected to a DVR within a home with the media server having Internet access.
Figure 23:
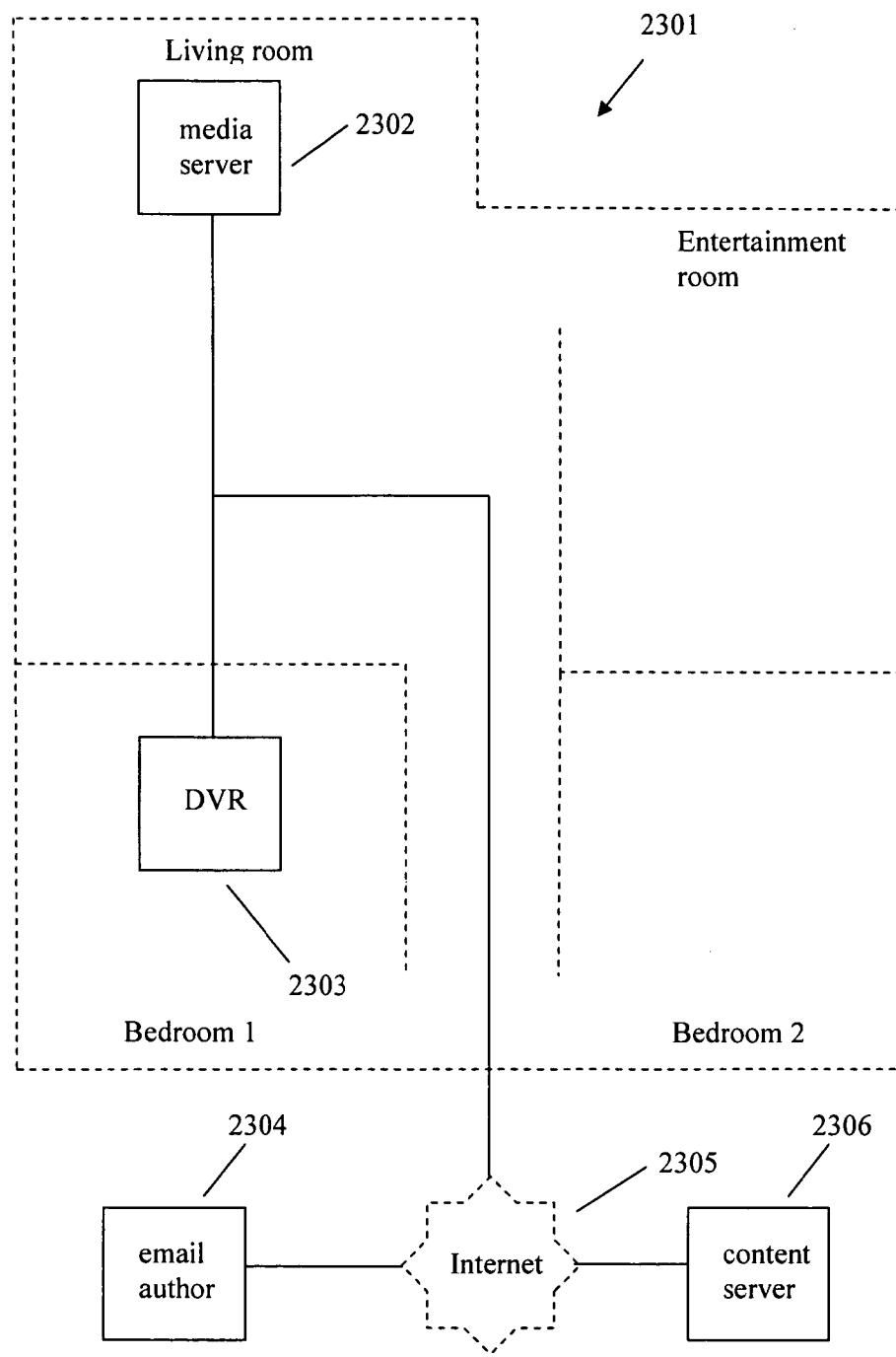
FIG. 23 is a block diagram illustrating a media server in a local network connected to a DVR within a home with both the media server and DVR having Internet access.

Referring to FIGS. 22 and 23, a typical household DVR setup 2201 is shown. Assume only the media server 2202 has access to the Internet 2205. An email author 2204 creates a content file with authoring software. The file, for example, contains the actual binary data for several images in JPEG format (it can contain any type of content). The content file is emailed as an attachment to a user who accesses email from the same computer running the media server 2202. Message communication mechanisms other than email may be used in alternative embodiments.

The user reads the email and, if he is interested in the content, the user selects the attached content file, invoking the media server 2202 to process the content file. The media server 2202 adds information about the images to an internal database from which container (metadata) information and JPEG data can be later generated.

The user goes to his DVR 2203 and accesses the "Music & Photos" feature via his television set, causing the DVR 2203 to request container information from the media server 2202. Among the other containers of available content shown in photo content screen 2101 (FIG. 21), the user can now access one with images from the content file. When the user issues the command to view one of the images, the DVR 2203 makes a request to the media server 2202, which consults its internal database to render the appropriate JPEG data and pass the data to the DVR 2203. The DVR 2203 displays the image to the user and does not store the image on its local storage device. The user can use trickplay functions on the multiple photo files such as fast forward, pause, reverse, play (slideshow), etc.

In FIG. 23, a household DVR setup 2301 is shown where both the DVR 2303 and media server 2302 have access to the Internet 2305. An author 2304 creates a content file with authoring software. The file links to one or more content files, such as MP3 music files, housed on the content server 2306 and served via HTTP. The content file is emailed as an attachment to a user who (ideally) accesses email from the same computer running the media server 2302.

The user reads the email and, if he is interested in the content, the user selects the attached content file, invoking the media server 2302 to process the content file. The media server 2302 adds information about the content files to an internal database from which container information can be later generated.

The customer goes to his DVR 2303 and accesses the "Music & Photos" feature, causing the DVR 2203 to request container information from the media server 2302. Among the other containers of available content shown in music content screen 2001 (FIG. 20), the customer can now access one with music served by the content server 2306. When the user issues the command to play one of the music files, the DVR 2303 accesses the content server 2306 directly over the Internet 2305 to retrieve the appropriate data. The user can use trickplay functions on the music files such as fast forward, pause, reverse, play, etc. The progress of through the music is displayed to the user through a connected television set using a replay bar as shown in FIG. 8. The DVR 2303 does not store the music on its storage device for copyright protection.

As noted above, the two preceding examples can be used for any type of content that a DVR can use or display. If configuration information is received, the DVR 2303 will store the configuration information on its local storage device and use the configuration information to configure itself. If video is received, the DVR 2303 can store the video content on its local storage device for later playback by the user. The user can use trickplay functions on the video content such as fast forward, pause, reverse, play, slow play, frame step, etc.

DVR users could use the approach to share content with each other via email. For example, one user could send to another user a content file with links to personal photos housed on the first customer's PC.

The approach herein can be further useful for third party vendors to market content to DVR users via email. For example, a record label could promote a new album by sending a content file with links to MP3 files containing sample songs.

Third party partners can use the approach herein to deliver product to DVR users via email. For example, a film processing lab could email a content file containing digitized photos purchased online by a DVR user.

L. Example Embodiments

According to an embodiment, a method for securely transferring multimedia content within a network comprises the computer-implemented steps of: providing a main server; providing a database on the main server that contains registered client systems and corresponding information; wherein a user selects a set of clients from the database that he wants to share or transfer media between; wherein the main server creates a digital certificate that identifies the set of clients; and wherein the digital certificate includes each client's serial number and its corresponding public encryption key.

In an embodiment, the user assigns a name to a client, and the name that the user has assigned to the client is inserted into the certificate. In an embodiment, an expiration date is included in the certificate. In an embodiment, the method further comprises sending the certificate to each client listed in the certificate. In an embodiment, a digital signature identifying the main server is included in the certificate. In an embodiment, each client verifies the certificate by validating the digital signature in the certificate. In an embodiment, a client finds its peers listed in the certificate.

In an embodiment, the client systems are digital video recorders (DVR). In an embodiment, the user designates a content server from among the clients listed in the certificate as a source of multimedia content, and the content server can be a PC, digital video recorder (DVR), or other type of data server. In an embodiment, the content server creates a strongly encrypted connection with a client by creating a random strong key, wherein the content server encrypts the strong key using the client's public key from the certificate, and wherein the content server sends the encrypted strong key to the client. In an embodiment, the client decrypts the strong key using its private key, and wherein the strong key is used to encrypt communications between the content server and the client. In an embodiment, the client requests certain recorded content from the content server. In an embodiment, the content server encrypts a recording key used to encrypt the requested recorded content using the strong key, and the content server sends the encrypted recording key and the requested recorded content to the client. In an embodiment, the client decrypts the recording key using the strong key and stores the recording key, the client writes the requested recorded content directly to its storage device without decoding it, and, when the client plays back the recorded content, it decodes the content on the fly using the recording key.

In an embodiment, the method further comprises: providing a content server, wherein the content server contains a plurality of multimedia content. In an embodiment, the content server creates a strongly encrypted connection with a client by creating a random strong key, wherein the content server encrypts the strong key using the client's public key from the certificate, and wherein the content server sends the encrypted strong key to the client. In an embodiment, the client decrypts the strong key using its private key, and the strong key is used to encrypt communications between the content server and the client. In an embodiment, the client requests certain recorded content from the content server. In an embodiment, the content server encrypts a recording key used to encrypt the requested recorded content using the strong key, and the content server sends the encrypted recording key and the requested recorded content to the client. In an embodiment, the client decrypts the recording key using the strong key and stores the recording key, wherein the client writes the requested recorded content directly to its storage device without decoding it, and wherein when the client plays back the recorded content, it decodes the content on the fly using the recording key.

According to an embodiment, an apparatus comprises the main server and the database, and the apparatus is configured to perform any one or more of the above recited methods. According to an embodiment, a computer-readable medium carries one or more sequences of instructions for securely transferring multimedia content within a network, wherein execution of the one or more sequences of instructions by one or more processors causes the one or more processors to perform any one or more of the above recited methods.

According to an embodiment, a method for preserving coherency of a computer's secure cache comprises the computer-implemented steps of: providing a first computer; providing a second computer; creating a strong communications key on the first computer; storing the strong communications key on the first computer; encrypting the strong communications key using the public key of the second computer; and sending the encrypted strong communications key to the second computer; wherein the second computer checks its local cache for an entry from the first computer and, if an entry exists, performs a comparison between a stored encrypted strong communications key in its local cache and the received encrypted strong communications key.

In an embodiment, the second computer decrypts the strong communications key and stores the strong communications key in its local cache along with the encrypted strong communications key and the first computer's machine serial number. In an embodiment, upon restart, the second computer requests the strong communications key from the first computer. In an embodiment, the first computer encrypts its stored strong communications key using the second computer's public key and sends the encrypted strong communications key to the second computer. In an embodiment, if the comparison shows that the two keys are equal, then the second computer uses the decrypted strong communications key stored in its local cache and, if the comparison shows that the two keys are not equal, then the second computer decrypts the received strong communications key and stores the decrypted strong communications key, the encrypted strong communications key, and the first computer's machine serial number in its local cache.

According to an embodiment, an apparatus comprises a first computer and a second computer, and the apparatus is configured to perform any one or more of the above recited methods. According to an embodiment, a computer-readable medium carries one or more sequences of instructions for securely transferring multimedia content within a network, wherein execution of the one or more sequences of instructions by one or more processors causes the one or more processors to perform any one or more of the above recited methods.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving, at a first client system, a digital certificate, the digital certificate comprising at least a first identifier of the first client system and a second identifier of a second client system;
   receiving, at a first client system, a first request to send a first media content item to the second client system;
   sending a first encrypted media content item corresponding to the first media content item from the first client system to the second client system;
   based at least partially on the digital certificate identifying the first client system and the second client system, the first client system sending a first recording key for the second client system to decrypt the first encrypted media content item;
   subsequent to the first request, receiving, at the first client system, a second request to send a second media content item to the second client system;
   separately sending a second encrypted media content item corresponding to the second media content item from the first client system to the second client system; and
   based at least partially on the same digital certificate identifying the first client system and the second client system, the first client system sending a second recording key for the second client system to decrypt the second encrypted media content item, the second recording key being different than the first recording key.

2. The method of claim 1,
   wherein sending the first recording key and sending the second recording key is further based upon determining that the digital certificate comprises a signature from a registration server; and
   wherein the digital certificate indicates that the first client system and the second client system are registered with the registration server to a common user and are authorized to share media content.

3. The method of claim 1, further comprising:
   encrypting the first recording key and the second recording key using a strong key;
   sending the strong key from the first client system to the second client system; and
   wherein the second client system is configured to decrypt the first recording key and the second recording key using the strong key.

4. The method of claim 1, further comprising:
   encrypting a strong key at the first client system using a public key for the second client system, the digital certificate comprising the public key;
   encrypting the first recording key and the second recording key using the strong key;
   sending the strong key from the first client system to the second client system;
   wherein the second client system is configured to decrypt the encrypted strong key using a private key that is associated with the public key; and
   wherein the second client system is configured to decrypt the first recording key and the second recording key using the strong key.

5. The method of claim 1, further comprising:
   generating first encrypted versions of the first recording key and the second recording key using a first strong key;
   sending the first strong key and the first encrypted versions of the first recording key and the second recording key from the first client system to the second client system;
   sending at least the first encrypted media content item and the second encrypted media content item from the first client system to a third client system identified by the digital certificate;
   generating second encrypted versions of the first recording key and the second recording key using a second strong key that is different than the first strong key; and
   the first client system sending second key information to the third client system, the second key information including the second strong key and the second encrypted versions of the first recording key and the second recording key.

6. The method of claim 1, further comprising:
   the first client system sending a list of contents accessible at the first client system to the second client system;
   wherein sending the first encrypted media content item and the first recording key is responsive to the first request, and sending the second encrypted media content item and the second recording key is responsive to the second request.

7. The method of claim 1, further comprising sending the first recording key responsive to having determined that an expiration date indicated in the digital certificate is later than a current time.

8. The method of claim 1, wherein the second client system is configured to locate the first client system using a peer discovery protocol, the locating being based on the digital certificate.

9. The method as recited in claim 1,
wherein the first client system is a digital video recorder (DVR), personal computer (PC), or a content server; and
wherein the first encrypted media content item and the second encrypted media content item are separate music files, or any separate photo files, or are separate video files.

10. One or more non-transitory computer-readable media storing instructions configured to, when executed by one or more computing devices, cause performance of:
receiving, at a first client system, a digital certificate, the digital certificate comprising at least a first identifier of the first client system and a second identifier of a second client system;
receiving, at the first client system, a first request to send a first media content item to the second client system;
sending a first encrypted media content item corresponding to the first media content item from the first client system to the second client system;
based at least partially on the digital certificate identifying the first client system and the second client system, the first client system sending a first recording key for the second client system to decrypt the first encrypted media content item;
subsequent to the first request, receiving, at the first client system, a second request to send a second media content item to the second client system;
separately sending a second encrypted media content item corresponding to the second media content item from the first client system to the second client system; and
based at least partially on the same digital certificate identifying the first client system and the second client system, the first client system sending a second recording key for the second client system to decrypt the second encrypted media content item, the second recording key being different than the first recording key.

11. The one or more non-transitory computer-readable media of claim 10, wherein the instructions are further configured to, when executed by the one or more computing devices, cause performance of:
encrypting the first recording key and the second recording key using a strong key;
sending the strong key from the first client system to the second client system; and
wherein the second client system is configured to decrypt the first recording key and the second recording key using the strong key.

12. The one or more non-transitory computer-readable media of claim 10, wherein the instructions are further configured to, when executed by the one or more computing devices, cause performance of:
encrypting a strong key at the first client system using a public key for the second client system, the digital certificate comprising the public key; and
encrypting the first recording key and the second recording key using the strong key;
sending the strong key from the first client system the second client system;
wherein the second client system is configured to decrypt the encrypted strong key using a private key that is associated with the public key; and
wherein the second client system is configured to decrypt the first recording key and the second recording key using the strong key.

13. The one or more non-transitory computer-readable media of claim 10, wherein the instructions are further configured to, when executed by the one or more computing devices, cause performance of:
generating first encrypted versions of the first recording key and the second recording key using a first strong key;
sending the first strong key and the first encrypted versions of the first recording key and the second recording key from the first client system to the second client system;
sending at least the first encrypted media content item and the second encrypted media content item from the first client system to a third client system identified by the digital certificate;
generating second encrypted versions of the first recording key and the second recording key using a second strong key that is different than the first strong key; and
the first client system sending second key information to the third client system, the second key information including the second strong key and the second encrypted versions of the first recording key and the second recording key.

14. The one or more non-transitory computer-readable media of claim 10, wherein the instructions are further configured to, when executed by the one or more computing devices, cause performance of:
the first client system sending a list of contents accessible at the first client system to the second client system;
wherein sending the first encrypted media content item and the first recording key is responsive to the first request, and sending the second encrypted media content item and the second recording key is responsive to the second request.

15. The one or more non-transitory computer-readable media of claim 10, wherein the instructions are further configured to, when executed by the one or more computing devices, cause performance of: sending the first recording key responsive to having determined that an expiration date indicated in the digital certificate is later than a current time.

16. The one or more non-transitory computer-readable media of claim 10:
wherein the first client system is a digital video recorder (DVR), personal computer (PC), or a content server; and
wherein the first encrypted media content item and the second encrypted media content item are separate music files, or are separate photo files, or are separate video files.

17. A system comprising at least a first client system, the first client system comprising:
a module, implemented at least partially by computing hardware, configured to receive, at the first client system, a digital certificate, the digital certificate comprising at least a first identifier of the first client system and a second identifier of a second client system;
a module, implemented at least partially by computing hardware, configured to receive, at the first client system, a first request to send a first media content item to the second client system, and subsequent to the first request, a second request to send a second media content item to the second client system;
a module, implemented at least partially by computing hardware, configured to send a first encrypted media content item corresponding to the first media content item from the first client system to the second client system and, separately, a second encrypted media content item corresponding to the second media content item from the first client system to the second client system; and;

a module, implemented at least partially by computer hardware, configured to, based at least partially on the digital certificate identifying the first client system and the second client system, from the first client system a first recording key for the second client system to decrypt the first encrypted media content item, and based at least partially on the same digital certificate identifying the first client system and the second client system, send from the first client system a second recording key for the second client system to decrypt the second encrypted media content item, the second recording key being different than the first recording key.

18. The system of claim 17, the first client system further comprising:

a module, implemented at least partially by computing hardware, configured to encrypt the first recording key and the second recording key using a strong key;

a module, implemented at least partially by computing hardware, configured to send the strong key from the first client system to the second client system; and wherein the second client system is configured to decrypt the first recording key and the second recording key using the strong key.

19. The system of claim 17, the first client system further comprising:

a module, implemented at least partially by computing hardware, configured to encrypt a strong key at the first client system using a public key for the second client system, the digital certificate comprising the public key;

a module, implemented at least partially by computing hardware, configured to encrypt the first recording key and the second recording key using the strong key;

a module, implemented at least partially by computing hardware, configured to send the encrypted strong key from the first client system to the second client system;

wherein the second client system is configured to decrypt the encrypted strong key using a private key that is associated with the public key; and wherein the second client system is configured to decrypt the first recording key and the second recording key using the strong key.

20. The system of claim 17, the first client system further comprising:

a module, implemented at least partially by computing hardware, configured to generate first encrypted versions of the first recording key and the second recording key using a first strong key;

a module, implemented at least partially by computing hardware, configured to send the first strong key and the first encrypted versions of the first recording key and the second recording key from the first client system to the second client system;

a module, implemented at least partially by computing hardware, configured to send at least the first encrypted media content and the second encrypted media content to a third client system identified by the digital certificate;

a module, implemented at least partially by computing hardware, configured to generate second encrypted versions of the first recording key and the second recording key using a second strong key that is different than the first strong key; and a module, implemented at least partially by computing hardware, configured to send the second key information to the third client system, the second key information including the second strong key and the second encrypted versions of the first recording key and the second recording key.

21. The system of claim 17, the first client system further comprising:

a module, implemented at least partially by computing hardware, configured to send a list of contents accessible at the first client system to the second client system;

wherein sending the first encrypted media content item and the first recording key is responsive to the first request, and sending the second encrypted media content item and the second recording key is responsive to the second request.

22. The system of claim 17, the first client system further comprising a module, implemented at least partially by computing hardware, configured to send the first recording key responsive to having determined that an expiration date indicated in the digital certificate is later than a current time.

23. The system of claim 17, further comprising the second client system, the second client system configured to locate the first client system using a peer discovery protocol, based on the digital certificate.

24. The system of claim 17, wherein the first client system is a digital video recorder (DVR), personal computer (PC), or a content server; and wherein the first encrypted media content item and the second encrypted media content item are separate music files, or are separate photo files, or are separate video files.

* * * * *